United States Patent
Avramov et al.

(10) Patent No.: US 10,177,977 B1
(45) Date of Patent: *Jan. 8, 2019

(54) DEPLOYMENT AND UPGRADE OF NETWORK DEVICES IN A NETWORK ENVIRONMENT

(71) Applicant: CISCO TECHNOLOGY, INC., San Jose, CA (US)

(72) Inventors: Lucien M. Avramov, Sunnyvale, CA (US); Sameer Kittur, Bangalore (IN); Chandrasekhar V. Modumudi, Bangalore (IN); Praful G. Bhaidasna, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 322 days.

This patent is subject to a terminal disclaimer.

(21) Appl. No.: 15/013,480

(22) Filed: Feb. 2, 2016

Related U.S. Application Data

(63) Continuation of application No. 13/766,458, filed on Feb. 13, 2013, now Pat. No. 9,286,047.

(51) Int. Cl.
  *G06F 15/177* (2006.01)
  *H04L 29/06* (2006.01)
  (Continued)

(52) U.S. Cl.
  CPC .......... *H04L 41/0809* (2013.01); *H04L 45/02* (2013.01)

(58) Field of Classification Search
  CPC ....... H04L 12/26; H04L 12/24; G06F 15/177; G06F 12/02; G06F 9/445; G06F 15/16; G06F 15/173
  See application file for complete search history.

(56) References Cited

U.S. PATENT DOCUMENTS 5,555,416 A  9/1996 Ownes et al.
5,742,829 A  4/1998 Davis et al.
(Continued)

FOREIGN PATENT DOCUMENTS

CN  101093452  12/2007
CN  101770551  7/2010
(Continued)

OTHER PUBLICATIONS

Cisco Systems, Inc. "Cisco, Nexus 3000 Series NX-OS Release Notes, Release 5.0(3)U3(1)," Feb. 29, 2012, Part No. OL-26631-01, 16 pages; http://www.cisco.com/en/US/docs/switches/datacenter/nexus3000/sw/release/503_u3_1/n3k_rel_notes_503_u3_1.html.
(Continued)

*Primary Examiner* — Kevin T Bates
*Assistant Examiner* — Mark A Scott
(74) *Attorney, Agent, or Firm* — Polsinelli PC

(57) ABSTRACT

A method for deployment and upgrade of network devices in a network environment includes receiving (for example, at a switch being activated in the network environment), Dynamic Host Configuration Protocol (DHCP) information (for example, from a DHCP server in the network environment). The DHCP information includes a filename and location of a script file. The method further includes downloading the script file from a script server in the network environment and executing the script file. Executing the script file includes copying a configuration file and one or more software images to a memory element of the switch, where the configuration file includes configuration settings relevant to at least a switch identity, and a switch location in the network environment, installing the software images on the switch, rebooting the switch, applying configuration settings from the configuration file to the software images, and saving the configuration file to the memory element.

20 Claims, 10 Drawing Sheets

(51) Int. Cl.
*H04L 12/24* (2006.01)
*H04L 12/751* (2013.01)

(56) References Cited

U.S. PATENT DOCUMENTS

| | | | |
|---|---|---|---|
| 5,903,545 A | 5/1999 | Sabourin et al. |
| 6,012,096 A | 1/2000 | Link et al. |
| 6,144,962 A | 11/2000 | Weinberg et al. |
| 6,247,058 B1 | 6/2001 | Miller et al. |
| 6,330,562 B1 | 12/2001 | Boden et al. |
| 6,525,658 B2 | 2/2003 | Streetman et al. |
| 6,597,663 B1 | 7/2003 | Rekhter |
| 6,611,896 B1 | 8/2003 | Mason, Jr. et al. |
| 6,728,779 B1 | 4/2004 | Griffin et al. |
| 6,801,878 B1 | 10/2004 | Hintz et al. |
| 6,847,993 B1 | 1/2005 | Novaes et al. |
| 6,925,490 B1 | 8/2005 | Novaes et al. |
| 6,958,998 B2 | 10/2005 | Shorey |
| 6,983,323 B2 | 1/2006 | Cantrell et al. |
| 6,996,817 B2 | 2/2006 | Birum et al. |
| 6,999,452 B1 | 2/2006 | Drummond-Murray et al. |
| 7,002,464 B2 | 2/2006 | Bruemmer et al. |
| 7,096,368 B2 | 8/2006 | Kouznetsov et al. |
| 7,111,055 B2 | 9/2006 | Falkner |
| 7,120,934 B2 | 10/2006 | Ishikawa |
| 7,162,643 B1 | 1/2007 | Sankaran et al. |
| 7,181,769 B1 | 2/2007 | Keanini et al. |
| 7,185,103 B1 | 2/2007 | Jain |
| 7,337,206 B1 | 2/2008 | Wen et al. |
| 7,353,511 B1 | 4/2008 | Ziese |
| 7,356,679 B1 | 4/2008 | Le et al. |
| 7,360,072 B1 | 4/2008 | Soltis |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,466,681 B2 | 12/2008 | Ashwood-Smith et al. |
| 7,467,205 B1 | 12/2008 | Dempster et al. |
| 7,496,040 B2 | 2/2009 | Seo |
| 7,496,575 B2 | 2/2009 | Buccella et al. |
| 7,530,105 B2 | 5/2009 | Gilbert et al. |
| 7,539,770 B2 | 5/2009 | Meier |
| 7,568,107 B1 | 7/2009 | Rathi et al. |
| 7,610,330 B1 | 10/2009 | Quinn et al. |
| 7,633,942 B2 | 12/2009 | Bearden et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,743,242 B2 | 6/2010 | Oberhaus et al. |
| 7,752,307 B2 | 7/2010 | Takara |
| 7,774,498 B1 | 8/2010 | Kraemer et al. |
| 7,783,457 B2 | 8/2010 | Cunningham |
| 7,787,480 B1 | 8/2010 | Mehta et al. |
| 7,788,477 B1 * | 8/2010 | Huang ............ G06F 9/4416 713/1 |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,056,134 B1 | 11/2011 | Ogilvie |
| 8,135,657 B2 | 3/2012 | Kapoor et al. |
| 8,156,430 B2 | 4/2012 | Newman |
| 8,160,063 B2 | 4/2012 | Maltz et al. |
| 8,179,809 B1 | 5/2012 | Eppstein et al. |
| 8,181,248 B2 | 5/2012 | Oh et al. |
| 8,185,824 B1 | 5/2012 | Mitchell et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,365,286 B2 | 1/2013 | Poston |
| 8,370,407 B1 | 2/2013 | Devarajan et al. |
| 8,381,289 B1 | 2/2013 | Pereira et al. |
| 8,391,270 B2 | 3/2013 | Van Der Stok et al. |
| 8,407,164 B2 | 3/2013 | Malik et al. |
| 8,413,235 B1 | 4/2013 | Chen et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,489,765 B2 | 7/2013 | Vasseur et al. |
| 8,516,590 B1 | 8/2013 | Ranadive et al. |
| 8,527,977 B1 | 9/2013 | Cheng et al. |
| 8,549,635 B2 | 10/2013 | Muttik et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,572,739 B1 | 10/2013 | Cruz et al. |
| 8,588,081 B2 | 11/2013 | Salam et al. |
| 8,600,726 B1 | 12/2013 | Varshney et al. |
| 8,613,084 B2 | 12/2013 | Dalcher |
| 8,630,316 B2 | 1/2014 | Haba |
| 8,631,464 B2 | 1/2014 | Belakhdar et al. |
| 8,640,086 B2 | 1/2014 | Bonev et al. |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,706,914 B2 | 4/2014 | Duchesneau |
| 8,713,676 B2 | 4/2014 | Pandrangi et al. |
| 8,719,452 B1 | 5/2014 | Ding et al. |
| 8,719,835 B2 | 5/2014 | Kanso et al. |
| 8,752,042 B2 | 6/2014 | Ratica |
| 8,752,179 B2 | 6/2014 | Zaitsev |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,776,180 B2 | 7/2014 | Kumar et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,931,043 B2 | 1/2015 | Cooper et al. |
| 8,954,610 B2 | 2/2015 | Berke et al. |
| 8,955,124 B2 | 2/2015 | Kim et al. |
| 8,966,021 B1 | 2/2015 | Allen |
| 8,966,625 B1 | 2/2015 | Zuk et al. |
| 8,973,147 B2 | 3/2015 | Pearcy et al. |
| 8,984,331 B2 | 3/2015 | Quinn |
| 8,990,386 B2 | 3/2015 | He et al. |
| 8,996,695 B2 | 3/2015 | Anderson et al. |
| 8,997,227 B1 | 3/2015 | Mhatre et al. |
| 9,015,716 B2 | 4/2015 | Fletcher et al. |
| 9,071,575 B2 | 6/2015 | Lemaster et al. |
| 9,088,598 B1 | 7/2015 | Zhang et al. |
| 9,110,905 B2 | 8/2015 | Polley et al. |
| 9,117,075 B1 | 8/2015 | Yeh |
| 9,130,836 B2 | 9/2015 | Kapadia et al. |
| 9,152,789 B2 | 10/2015 | Natarajan et al. |
| 9,160,764 B2 | 10/2015 | Stiansen et al. |
| 9,178,906 B1 | 11/2015 | Chen et al. |
| 9,185,127 B2 | 11/2015 | Neou et al. |
| 9,191,402 B2 | 11/2015 | Yan |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |

(56) References Cited

U.S. PATENT DOCUMENTS

| | | |
|---|---|---|
| 9,246,773 B2 | 1/2016 | Degioanni |
| 9,258,217 B2 | 2/2016 | Duffield et al. |
| 9,281,940 B2 | 3/2016 | Matsuda et al. |
| 9,286,047 B1 | 3/2016 | Avramov et al. |
| 9,294,486 B1 | 3/2016 | Chiang et al. |
| 9,317,574 B1 | 4/2016 | Brisebois et al. |
| 9,319,384 B2 | 4/2016 | Yan et al. |
| 9,369,479 B2 | 6/2016 | Lin |
| 9,396,327 B2 | 6/2016 | Shimomura et al. |
| 9,405,903 B1 | 8/2016 | Xie et al. |
| 9,418,222 B1 | 8/2016 | Rivera et al. |
| 9,454,324 B1 | 9/2016 | Madhavapeddi |
| 9,501,744 B1 | 11/2016 | Brisebois et al. |
| 9,621,413 B1* | 4/2017 | Lee ............. H04L 41/08 |
| 9,634,915 B2 | 4/2017 | Bley |
| 9,645,892 B1 | 5/2017 | Patwardhan |
| 9,733,973 B2 | 8/2017 | Prasad et al. |
| 2002/0053033 A1 | 5/2002 | Cooper et al. |
| 2002/0103793 A1 | 8/2002 | Koller et al. |
| 2002/0141343 A1 | 10/2002 | Bays |
| 2002/0184393 A1 | 12/2002 | Leddy et al. |
| 2003/0097439 A1 | 5/2003 | Strayer et al. |
| 2003/0126242 A1 | 7/2003 | Chang |
| 2003/0145232 A1 | 7/2003 | Poletto et al. |
| 2003/0154399 A1 | 8/2003 | Zuk et al. |
| 2003/0177208 A1 | 9/2003 | Harvey |
| 2004/0030776 A1 | 2/2004 | Cantrell et al. |
| 2004/0243533 A1 | 12/2004 | Dempster et al. |
| 2004/0255050 A1 | 12/2004 | Takehiro et al. |
| 2004/0268149 A1 | 12/2004 | Aaron |
| 2005/0028154 A1 | 2/2005 | Smith et al. |
| 2005/0039104 A1 | 2/2005 | Shah et al. |
| 2005/0063377 A1 | 3/2005 | Bryant et al. |
| 2005/0083933 A1 | 4/2005 | Fine et al. |
| 2005/0166066 A1 | 7/2005 | Ahuja et al. |
| 2005/0177829 A1 | 8/2005 | Vishwanath |
| 2005/0185621 A1 | 8/2005 | Sivakumar et al. |
| 2005/0198629 A1 | 9/2005 | Vishwanath |
| 2005/0207376 A1 | 9/2005 | Ashwood-Smith et al. |
| 2005/0257244 A1 | 11/2005 | Joly et al. |
| 2005/0289244 A1 | 12/2005 | Sahu et al. |
| 2006/0048218 A1 | 3/2006 | Lingafelt et al. |
| 2006/0080733 A1 | 4/2006 | Khosmood et al. |
| 2006/0095968 A1 | 5/2006 | Portolani et al. |
| 2006/0143432 A1* | 6/2006 | Rothman ............ G06F 9/4416 713/2 |
| 2006/0156408 A1 | 7/2006 | Himberger et al. |
| 2006/0173912 A1 | 8/2006 | Lindvall |
| 2006/0195448 A1 | 8/2006 | Newport |
| 2006/0272018 A1 | 11/2006 | Fouant |
| 2006/0274659 A1 | 12/2006 | Ouderkirk |
| 2006/0280179 A1 | 12/2006 | Meier |
| 2006/0294219 A1 | 12/2006 | Ogawa et al. |
| 2007/0025306 A1* | 2/2007 | Cox ............ H04L 41/0806 370/338 |
| 2007/0044147 A1 | 2/2007 | Choi et al. |
| 2007/0097976 A1 | 5/2007 | Wood et al. |
| 2007/0118654 A1* | 5/2007 | Jamkhedkar ............ G06F 8/60 709/226 |
| 2007/0162420 A1* | 7/2007 | Ou ............ G06F 17/30575 |
| 2007/0169179 A1 | 7/2007 | Narad |
| 2007/0195729 A1 | 8/2007 | Li et al. |
| 2007/0195797 A1 | 8/2007 | Patel et al. |
| 2007/0211637 A1 | 9/2007 | Mitchell |
| 2007/0214348 A1 | 9/2007 | Danielsen |
| 2007/0230415 A1 | 10/2007 | Malik |
| 2007/0250930 A1 | 10/2007 | Aziz |
| 2007/0300061 A1 | 12/2007 | Kim et al. |
| 2008/0022385 A1 | 1/2008 | Crowell et al. |
| 2008/0046708 A1 | 2/2008 | Fitzgerald et al. |
| 2008/0056124 A1 | 3/2008 | Nanda et al. |
| 2008/0082662 A1 | 4/2008 | Danliker et al. |
| 2008/0101234 A1 | 5/2008 | Nakil et al. |
| 2008/0120350 A1 | 5/2008 | Grabowski |
| 2008/0126534 A1 | 5/2008 | Mueller et al. |
| 2008/0155245 A1* | 6/2008 | Lipscombe ............ G06F 9/4416 713/2 |
| 2008/0250122 A1 | 10/2008 | Zsigmond et al. |
| 2008/0270199 A1 | 10/2008 | Chess et al. |
| 2008/0301765 A1 | 12/2008 | Nicol et al. |
| 2009/0059934 A1 | 3/2009 | Aggarwal et al. |
| 2009/0064332 A1 | 3/2009 | Porras et al. |
| 2009/0133126 A1 | 5/2009 | Jang et al. |
| 2009/0241170 A1 | 9/2009 | Kumar et al. |
| 2009/0292795 A1* | 11/2009 | Ford ............ H04L 41/0806 709/222 |
| 2009/0300180 A1* | 12/2009 | DeHaan ............ H04L 41/0266 709/225 |
| 2009/0307753 A1 | 12/2009 | Dupont et al. |
| 2009/0313373 A1 | 12/2009 | Hanna et al. |
| 2009/0313698 A1 | 12/2009 | Wahl |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0049839 A1* | 2/2010 | Parker ............ H04L 41/0806 709/221 |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0138526 A1* | 6/2010 | DeHaan ............ H04L 41/0806 709/223 |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0180016 A1 | 7/2010 | Bugwadia et al. |
| 2010/0220584 A1 | 9/2010 | DeHaan et al. |
| 2010/0235514 A1 | 9/2010 | Beachem |
| 2010/0235915 A1 | 9/2010 | Memon et al. |
| 2010/0287266 A1* | 11/2010 | Asati ............ H04L 12/4641 709/222 |
| 2010/0303240 A1 | 12/2010 | Beachem |
| 2010/0319060 A1 | 12/2010 | Aiken et al. |
| 2011/0010585 A1 | 1/2011 | Bugenhagen et al. |
| 2011/0022641 A1* | 1/2011 | Werth ............ H04L 67/34 707/803 |
| 2011/0055381 A1 | 3/2011 | Narasimhan et al. |
| 2011/0055388 A1 | 3/2011 | Yumerefendi et al. |
| 2011/0066719 A1 | 3/2011 | Miryanov et al. |
| 2011/0069685 A1 | 3/2011 | Tofighbakhsh |
| 2011/0072119 A1* | 3/2011 | Bronstein ............ H04L 41/046 709/222 |
| 2011/0083125 A1 | 4/2011 | Komatsu et al. |
| 2011/0107074 A1 | 5/2011 | Chan et al. |
| 2011/0107331 A1 | 5/2011 | Evans |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0158088 A1* | 6/2011 | Lofstrand ............ G06F 9/465 370/229 |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0196957 A1 | 8/2011 | Ayachitula et al. |
| 2011/0202655 A1 | 8/2011 | Sharma et al. |
| 2011/0225207 A1 | 9/2011 | Subramanian et al. |
| 2011/0228696 A1 | 9/2011 | Agarwal et al. |
| 2011/0238793 A1* | 9/2011 | Bedare ............ H04L 45/586 709/220 |
| 2011/0246663 A1 | 10/2011 | Melsen et al. |
| 2011/0277034 A1 | 11/2011 | Hanson |
| 2011/0302652 A1 | 12/2011 | Westerfeld |
| 2011/0314148 A1 | 12/2011 | Petersen et al. |
| 2012/0005542 A1 | 1/2012 | Petersen et al. |
| 2012/0079592 A1 | 3/2012 | Pandrangi |
| 2012/0102361 A1 | 4/2012 | Sass et al. |
| 2012/0102543 A1 | 4/2012 | Kohli et al. |
| 2012/0117226 A1 | 5/2012 | Tanaka et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0197856 A1 | 8/2012 | Banka et al. |

(56) References Cited

U.S. PATENT DOCUMENTS

| | | |
|---|---|---|
| 2012/0198541 A1 | 8/2012 | Reeves |
| 2012/0216271 A1 | 8/2012 | Cooper et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240232 A1 | 9/2012 | Azuma |
| 2012/0246303 A1 | 9/2012 | Petersen et al. |
| 2012/0278021 A1 | 11/2012 | Lin et al. |
| 2012/0281700 A1 | 11/2012 | Koganti et al. |
| 2013/0003538 A1 | 1/2013 | Greenburg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0038358 A1 | 2/2013 | Cook et al. |
| 2013/0086272 A1 | 4/2013 | Chen et al. |
| 2013/0103827 A1 | 4/2013 | Dunlap et al. |
| 2013/0124807 A1 | 5/2013 | Nielsen et al. |
| 2013/0125107 A1 | 5/2013 | Bandakka |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0174256 A1 | 7/2013 | Powers |
| 2013/0179487 A1 | 7/2013 | Lubetzky et al. |
| 2013/0179879 A1 | 7/2013 | Zhang et al. |
| 2013/0198839 A1 | 8/2013 | Wei et al. |
| 2013/0201986 A1 | 8/2013 | Sajassi et al. |
| 2013/0205293 A1* | 8/2013 | Levijarvi ............... G06F 8/61 717/177 |
| 2013/0219161 A1 | 8/2013 | Fontignie et al. |
| 2013/0232498 A1 | 9/2013 | Mangtani et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0318357 A1 | 11/2013 | Abraham et al. |
| 2013/0326623 A1 | 12/2013 | Kruglick |
| 2013/0333029 A1 | 12/2013 | Chesla et al. |
| 2013/0336164 A1 | 12/2013 | Yang et al. |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0033193 A1 | 1/2014 | Palaniappan |
| 2014/0047185 A1 | 2/2014 | Peterson et al. |
| 2014/0047372 A1 | 2/2014 | Gnezdov et al. |
| 2014/0059200 A1 | 2/2014 | Nguyen et al. |
| 2014/0089494 A1 | 3/2014 | Dasari et al. |
| 2014/0096058 A1 | 4/2014 | Molesky et al. |
| 2014/0105029 A1 | 4/2014 | Jain et al. |
| 2014/0115219 A1 | 4/2014 | Ajanovic et al. |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0156861 A1 | 6/2014 | Lopez Da Silva |
| 2014/0164607 A1 | 6/2014 | Bai et al. |
| 2014/0165207 A1 | 6/2014 | Engel et al. |
| 2014/0173623 A1 | 6/2014 | Chang et al. |
| 2014/0192639 A1 | 7/2014 | Smirnov |
| 2014/0201717 A1 | 7/2014 | Mascaro et al. |
| 2014/0215573 A1 | 7/2014 | Cepuran |
| 2014/0215621 A1 | 7/2014 | Xaypanya et al. |
| 2014/0219079 A1 | 8/2014 | Kapadia et al. |
| 2014/0233387 A1* | 8/2014 | Zheng ............... H04L 67/1034 370/235 |
| 2014/0281030 A1 | 9/2014 | Cui et al. |
| 2014/0286354 A1 | 9/2014 | Van De Poel |
| 2014/0289854 A1 | 9/2014 | Mahvi |
| 2014/0298461 A1 | 10/2014 | Hohndel et al. |
| 2014/0307686 A1* | 10/2014 | Su ............... H04W 6/10 370/329 |
| 2014/0317737 A1 | 10/2014 | Shin et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2015/0006689 A1* | 1/2015 | Szilagyi ............... H04L 41/0886 709/222 |
| 2015/0009840 A1 | 1/2015 | Pruthi et al. |
| 2015/0026809 A1 | 1/2015 | Altman et al. |
| 2015/0033305 A1 | 1/2015 | Shear et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0058976 A1 | 2/2015 | Carney et al. |
| 2015/0067143 A1 | 3/2015 | Babakhan et al. |
| 2015/0082151 A1 | 3/2015 | Liang et al. |
| 2015/0082430 A1 | 3/2015 | Sridhara et al. |
| 2015/0085665 A1 | 3/2015 | Kompella et al. |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1 | 5/2015 | Agarwal et al. |
| 2015/0128133 A1 | 5/2015 | Pohlmann |
| 2015/0138993 A1 | 5/2015 | Forster et al. |
| 2015/0142962 A1 | 5/2015 | Srinivas et al. |
| 2015/0195291 A1 | 7/2015 | Zuk et al. |
| 2015/0249622 A1 | 9/2015 | Phillips et al. |
| 2015/0256555 A1 | 9/2015 | Choi et al. |
| 2015/0261842 A1 | 9/2015 | Huang et al. |
| 2015/0261886 A1 | 9/2015 | Wu et al. |
| 2015/0271255 A1 | 9/2015 | Mackay et al. |
| 2015/0295945 A1 | 10/2015 | Canzanese, Jr. et al. |
| 2015/0356297 A1 | 10/2015 | Yang et al. |
| 2015/0347554 A1 | 12/2015 | Vasantham et al. |
| 2015/0358352 A1 | 12/2015 | Chasin et al. |
| 2016/0006753 A1 | 1/2016 | McDaid et al. |
| 2016/0021131 A1 | 1/2016 | Heilig |
| 2016/0026552 A1 | 1/2016 | Holden et al. |
| 2016/0036837 A1 | 2/2016 | Jain et al. |
| 2016/0050132 A1 | 2/2016 | Zhang et al. |
| 2016/0072815 A1 | 3/2016 | Rieke et al. |
| 2016/0094529 A1 | 3/2016 | Mityagin |
| 2016/0103692 A1 | 4/2016 | Guntaka et al. |
| 2016/0105350 A1 | 4/2016 | Greifeneder et al. |
| 2016/0112270 A1 | 4/2016 | Danait et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0191476 A1 | 6/2016 | Schutz et al. |
| 2016/0205002 A1 | 7/2016 | Rieke et al. |
| 2016/0216994 A1 | 7/2016 | Sefidcon et al. |
| 2016/0294691 A1 | 10/2016 | Joshi |
| 2016/0308908 A1 | 10/2016 | Kirby et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parasdehgheibi et al. |
| 2016/0359680 A1 | 12/2016 | Parasdehgheibi et al. |
| 2016/0359686 A1 | 12/2016 | Parasdehgheibi et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |

(56) References Cited

U.S. PATENT DOCUMENTS

| | | | |
|---|---|---|---|
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parasdehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parasdehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2017/0034018 A1 | 2/2017 | Parasdehgheibi et al. |
| 2018/0006911 A1 | 1/2018 | Dickey |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| EP | 0811942 | 12/1997 |
| EP | 1076848 B1 | 7/2002 |
| EP | 1383261 | 1/2004 |
| EP | 1450511 | 8/2004 |
| EP | 2045974 | 4/2008 |
| EP | 2043320 A1 | 4/2009 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2015/099778 | 7/2015 |
| WO | WO 2016/004075 | 1/2016 |
| WO | WO 2016/019523 | 2/2016 |

OTHER PUBLICATIONS

Cisco Systems, Inc., "Nexus 3000 Series NX-OS Fundamentals Configuration Guide, Release 5.0(3)U3(1):*Using PowerOn Auto Provisioning*," Feb. 29, 2012, Part No. OL-26544-01, 10 pages; http://www.cisco.com/en/US/docs/switches/datacenter/nexus3000/sw/fundamentals/503_U3_1/b_Nexus_3000_Fundamentals_Guide_Release_503_U3_1_chapter_0111.pdf.

Cisco Systems, Inc., "Cisco IOS Configuration Fundamentals Configuration Guide: *Using Autoinstall and Setup*," Release 12.2, first published Apr. 2001, last updated Sep. 2003, 32 pages; http://www.cisco.com/en/US/docs/ios/12_2/configfun/configuration/guide/fcf002.html.

Arista Networks, Inc., "Application Visibility and Network Telemtry using Splunk," Arista White Paper, Nov. 2013, 11 pages.

Australian Government Department of Defence, Intelligence and Security, "Top 4 Strategies to Mitigate Targeted Cyber Intrusions," Cyber Security Operations Centre Jul. 2013, http://www.asd.gov.au/infosec/top-mitigations/top-4-strategies-explained.htm.

Author Unknown, "Blacklists & Dynamic Reputation: Understanding Why the Evolving Threat Eludes Blacklists," www.dambala.com, 9 pages, Dambala, Atlanta, GA, USA.

Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.

Backes, Michael, et al., "Data Lineage in Malicious Environments," IEEE 2015, pp. 1-13.

Bauch, Petr, "Reader's Report of Master's Thesis, Analysis and Testing of Distributed NoSQL Datastore Riak," May 28, 2015, Brno. 2 pages.

Bayati, Mohsen, et al., "Message-Passing Algorithms for Sparse Network Alignment," Mar. 2013, 31 pages.

Berezinski, Przemyslaw, et al., "An Entropy-Based Network Anomaly Detection Method," Entropy, 2015, vol. 17, www.mdpi.com/journal/entropy, pp. 2367-2408.

Berthier, Robin, et al. "Nfsight: Netflow-based Network Awareness Tool," 2010, 16 pages.

Bhuyan, Dhiraj, "Fighting Bots and Botnets," 2006, pp. 23-28.

Blair, Dana, et al., U.S. Appl. No. 62/106,006, filed Jan. 21, 2015, entitled "Monitoring Network Policy Compliance."

Bosch, Greg, "Virtualization," 2010, 33 pages.

Breen, Christopher, "MAC 911, How to dismiss MAC App Store Notifications," Macworld.com, Mar. 24, 2014, 3 pages.

Chandran, Midhun, et al., "Monitoring in a Virtualized Environment," GSTF International Journal on Computing, vol. 1, No. 1, Aug. 2010.

Chari, Suresh, et al., "Ensuring continuous compliance through reconciling policy with usage," Proceedings of the $18^{th}$ ACM symposium on Access control models and technologies (SACMAT '13). ACM, New York, NY, USA, 49-60.

Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.

Chou, C.W., et al., "Optical Clocks and Relativity," Science vol. 329, Sep. 24, 2010, pp. 1630-1633.

Cisco Systems, "Cisco Network Analysis Modules (NAM) Tutorial," Cisco Systems, Inc., Version 3.5.

Cisco Systems, Inc., "Addressing Compliance from One Infrastructure: Cisco Unified Compliance Solution Framework," 2014.

Cisco Systems, Inc., "Cisco Application Dependency Mapping Service," 2009.

Cisco Systems, Inc., "White Paper—New Cisco Technologies Help Customers Achieve Regulatory Compliance," 1992-2008.

Cisco Systems, Inc., "A Cisco Guide to Defending Against Distributed Denial of Service Attacks," May 3, 2016, 34 pages.

Cisco Systems, Inc., "Cisco Application Visibility and Control," Oct. 2011, 2 pages.

Cisco Systems, Inc., "Cisco Tetration Platform Data Sheet", Updated Mar. 5, 2018, 21 pages.

Cisco Technology, Inc., "Cisco Lock-and-Key:Dynamic Access Lists," http://www/cisco.com/en/us/support/docs/security-vpn/lock-key/7604-13.html; Updated Jul. 12, 2006, 16 pages.

Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.

Duan, Yiheng, et al., Detective: Automatically Identify and Analyze Malware Processes in Forensic Scenarios via DLLs, IEEE ICC 2015—Next Generation Networking Symposium, pp. 5691-5696.

Feinstein, Laura, et al., "Statistical Approaches to DDoS Attack Detection and Response," Proceedings of the DARPA Information Survivability Conference and Exposition (DISCEX '03), Apr. 2003, 12 pages.

George, Ashley, et al., "NetPal: A Dynamic Network Administration Knowledge Base," 2008, pp. 1-14.

Goldsteen, Abigail, et al., "A Tool for Monitoring and Maintaining System Trustworthiness at Run Time," REFSQ (2015), pp. 142-147.

Hamadi, S., et al., "Fast Path Acceleration for Open vSwitch in Overlay Networks," Global Information Infrastructure and Networking Symposium (GISS), Montreal, QC, pp. 1-5, Sep. 15-19, 2014.

(56) References Cited

OTHER PUBLICATIONS

Heckman, Sarah, et al., "On Establishing a Benchmark for Evaluating Static Analysis Alert Prioritization and Classification Techniques," IEEE, 2008; 10 pages.
Hewlett-Packard, "Effective use of reputation intelligence in a security operations center," Jul. 2013, 6 pages.
Hideshima, Yusuke, et al., "STARMINE: A Visualization System for Cyber Attacks," http://www.researchgate.net/publication/221536306, Feb. 2006, 9 pages.
Huang, Hing-Jie, et al., "Clock Skew Based Node Identification in Wireless Sensor Networks," IEEE, 2008, 5 pages.
InternetPerils, Inc., "Control Your Internet Business Risk," 2003-2015, http://www.internetperils.com.
Ives, Herbert, E., et al., "An Experimental Study of the Rate of a Moving Atomic Clock," Journal of the Optical Society of America, vol. 28, No. 7, Jul. 1938, pp. 215-226.
Janoff, Christian, et al., "Cisco Compliance Solution for HIPAA Security Rule Design and Implementation Guide," Cisco Systems, Inc., Updated Nov. 14, 2015, part 1 of 2, 350 pages.
Janoff, Christian, et al., "Cisco Compliance Solution for HIPAA Security Rule Design and Implementation Guide," Cisco Systems, Inc., Updated Nov. 14, 2015, part 2 of 2, 588 pages.
Kerrison, Adam, et al., "Four Steps to Faster, Better Application Dependency Mapping—Laying the Foundation for Effective Business Service Models," BMCSoftware, 2011.
Kim, Myung-Sup, et al. "A Flow-based Method for Abnormal Network Traffic Detection, " IEEE, 2004, pp. 599-612.
Kraemer, Brian, "Get to know your data center with CMDB," TechTarget, Apr. 5, 2006, http://searchdatacenter.techtarget.com/news/118820/Get-to-know-your-data-center-with-CMDB.
Lab SKU, "VMware Hands-on Labs—HOL-SDC-1301" Version: 20140321-160709, 2013; http://docs.hot.vmware.com/HOL-2013/holsdc-1301_html_en/ (part 1 of 2).
Lab SKU, "VMware Hands-on Labs—HOL-SDC-1301" Version: 20140321-160709, 2013; http://docs.hol.vmware.com/HOL-2013/holsdc-1301_html_en/ (part 2 of 2).
Lachance, Michael, "Dirty Little Secrets of Application Dependency Mapping," Dec. 26, 2007.
Landman, Yoav, et al., "Dependency Analyzer," Feb. 14, 2008, http://ifrog.com/confluence/display/DA/Home.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (GLOBECOM 2010, Dec. 2010, 6 pages.
Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.
Liu, Ting, et al., "Impala: A Middleware System for Managing Autonomic, Parallel Sensor Systems," In Proceedings of the Ninth ACM SIGPLAN Symposium on Principles and Practice of Parallel Programming(PPoPP '03), ACM, New York, NY, USA, Jun. 11-13, 2003, pp. 107-118.
Lu, Zhonghai, et al., "Cluster-based Simulated Annealing for Mapping Cores onto 2D Mesh Networks on Chip," Design and Diagnostics of Electronic Circuits and Systems, pp. 1, 6, Apr. 16-18, 2008.
Matteson, Ryan, "Depmap: Dependency Mapping of Applications Using Operating System Events: a Thesis," Master's Thesis, California Polytechnic State University, Dec. 2010.
Natarajan, Arun, et al., "NSDMiner: Automated Discovery of Network Service Dependencies," Institute of Electrical and Electronics Engineers INFOCOM, Feb. 2012, 9 pages.
Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.
Neverfail, "Neverfail IT Continuity Architect," 2015, https://web.archive.org/web/20150908090456/http://www.neverfailgroup.com/products/it-continuity-architect.
Nilsson, Dennis K., et al., "Key Management and Secure Software Updates in Wireless Process Control Environments," In Proceedings of the First ACM Conference on Wireless Network Security (WiSec '08), ACM, New York, Ny, USA, Mar. 31-Apr. 2, 2008, pp. 100-108.
Nunnally, Troy, et al., "P3D: A Parallel 3D Coordinate Visualization for Advanced Network Scans," IEEE 2013, Jun. 9-13, 2013, 6 pages.
O'Donnell, Glenn, et al., "The CMDB Imperative: How to Realize the Dream and Avoid the Nightmares," Prentice Hall, Feb. 19, 2009.
Ohta, Kohei, et al., "Detection, Defense, and Tracking of Internet-Wide Illegal Access in a Distributed Manner," 2000, pp. 1-16.
Pathway Systems International Inc., "How Blueprints does Integration," Apr. 15, 2014, 9 pages, http://pathwaysystems.com/com/company-blog/.
Pathway Systems International Inc., "What is Blueprints?" 2010-2016, http://pathwaysystems.com/blueprints-about/.
Popa, Lucian, et al., "Macroscope: End-Point Approach to Networked Application Dependency Discovery," CoNEXT'09, Dec. 1-4, 2009, Rome, Italy, 12 pages.
Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.
Sachan, Mrinmaya, et al., "Solving Electrical Networks to incorporate Supervision in Random Walks," May 13-17, 2013, pp. 109-110.
Sammarco, Matteo, et al., "Trace Selection for Improved WLAN Monitoring," Aug. 16, 2013, pp. 9-14.
Shneiderman, Ben, et al., "Network Visualization by Semantic Substrates," Visualization and Computer Graphics, vol. 12, No. 5, pp. 733,740, Sep.-Oct. 2006.
Thomas, R., "Bogon Dotted Decimal List," Version 7.0, Team Cymru NOC, Apr. 27, 2012, 5 pages.
Wang, Ru, et al., "Learning directed acyclic graphs via bootstarp aggregating," 2014, 47 pages, http://arxiv.org/abs/1406.2098.
Wang, Yongjun, et al., "A Network Gene-Based Framework for Detecting Advanced Persistent Threats," Nov. 2014, 7 pages.
Witze, Alexandra, "Special relativity aces time trial, 'Time dilation' predicted by Einstein confirmed by lithium ion experiment," Nature, Sep. 19, 2014, 3 pages.
Woodberg, Brad, "Snippet from Juniper SRX Series" Jun. 17, 2013, 1 page, O'Reilly Media, Inc.
Zatrochova, Zuzana, "Analysis and Testing of Distributed NoSQL Datastore Riak," Spring, 2015, 76 pages.
Zhang, Yue, et al., "CANTINA: A Content-Based Approach to Detecting Phishing Web Sites," May 8-12, 2007, pp. 639-648.

* cited by examiner

```
subnet 10.10.1.0 netmask 255.255.255.0 {
        option routers              10.10.1.32;
        option subnet-mask          255.255.255.0;
        option domain-name-servers  10.10.1.32;
        option tftp-server-name     10.10.1.50;
        option bootfile-name        "/poap_script.py";
        range                       10.10.1.101 10.10.1.199;
```

FIG. 4

```
#md5sum="d1fd3449f5285d90070bfd04d98e9bd1"

[root@imager-001 ~]# md5sum poap_script.py
d1fd3449f5285d90070bfd04d98e9bd1  poap_script.py
```

FIG. 5

```
# Host name and user credentials
username = "user"
password = "cisco\r"
hostname = "192.168.1.1"
vrf      = os.environ['POAP_VRF']
```

FIG. 6

```
# POAP can use 3 modes to obtain the configuration file.
# - 'poap_static' - file is statically specified
# - 'poap_location' - CDP neighbor of interface on which
DHCPDISCOVER arrived is used to derive the configuration file
# - 'poap_serial_number' - switch serial number is used to derive
the config file
poap_config_file_mode = "poap_serial_number"
```

FIG. 7

```
# Procedure to set config_file_src
def setSrcCfgFileNameLocation():
    global config_file_src, poap_script_log_handler, env
    startAppend = 0
    timeout = -1
    poap_write_to_file(poap_script_log_handler, "\nshow cdp neighbors interface %s" % os.environ['POAP_INTF'])
    cdpOutput = cli ("show cdp neighbors interface %s" % os.environ['POAP_INTF'])
    cdpOutArray = cdpOutput[1].split("\n")
    cdpRaw = cdpOutArray[ 7].split()
    cdpRawIntf = cdpOutArray[len(cdpOutArray) - 2].split()
    cdplist = cdpRaw[0].split('(')
    switchName = cdplist[0]
    intfName   = cdpRawIntf[len(cdpRawIntf) - 1]
    config_file_src = "conf_%s_%s.cfg" % (switchName, intfName)
    config_file_src = string.replace(config_file_src, "/", "_")
    poap_write_to_file(poap_script_log_handler, "\nSelected conf file name : %s" % config_file_src)
```

```
System and Kickstart image info ######
# Source path of both System and Kickstart images
image_path = "/home/"
# Source file name of System Image
system_image_src = "switch-uk9.5.0.3.U3.2.bin"
# Destination file name of System Image
system_image_dst = "switch.s"
# indicates if System Image is copied
system_image_copied = 0
# Source file name of Kickstart Image
kickstart_image_src = "switch-uk9-kickstart.5.0.3.U3.2.bin"
# Destination file name of Kickstart Image
kickstart_image_dst = "switch.k"
# indicates if Kickstart Image is copied
kickstart_image_copied = 0
# Timeout info
config_timeout = 120
system_timeout = 2100
kickstart_timeout = 900
```

FIG. 9

```
verifyfreespace()

# copy config file and images
copyConfig()

# copy config file and images
copySystem()
copyKickstart()

signal.signal(signal.SIGTERM, sig_handler_no_exit)

# install images
installImages()

if emptyFirstFile is 0:
        cli ('copy bootflash:%s scheduled-config' % config_file_dst_first)
        poap_write_to_file(poap_script_log_handler, "\n
### Copying the first scheduled cfg done ##########")
        removeFile("/bootflash/%s" % config_file_dst_first)

cli ('copy bootflash:%s scheduled-config' % config_file_dst_second)
poap_write_to_file(poap_script_log_handler, "\n########## Copying the second
scheduled cfg done ##########")
removeFile("/bootflash/%s" % config_file_dst_second)
```

```
# Procedure to copy config file using global information
def copyConfig ():
    global username, hostname, config_path, config_file_src, config_file_dst,
config_timeout, poap_script_log_handler, emptyFirstFile, password
    org_file = config_file_dst
    if os.path.exists("/bootflash/%s" % org_file):
        poap_write_to_file(poap_script_log_handler, "\nINFO: File already
exists")
        emptyFirstFile = 0
        return poap_write_to_file(poap_script_log_handler, "\nINFO: Starting Copy of
Config File")
    tmp_file = "%s.tmp" % org _file
    time = config_timeout
    src = "%s%s" % (config_path, config_file_src)
    doCopy ("ftp", hostname, src, org_file, vrf, time, username, password,
tmp_file)
    config_copied = 1
    if copyMd5Info(config_path, config_file_src):
        md5sumGiven = getMD5SumGiven("md5sum", "%s.md5" % config_file_src)
        if md5sumGiven:
            if not verifyMD5sumofFile(md5sumGiven, "%s%s" % (destination_path,
org_file)):
            poap_write_to_file(poap_script_log_handler, "\n#### config
file MD5 verification failed #####\n")
            poap_script_log_handler.close()
            exit(1)
```

FIG. 11

```
# Procedure to split config file using global information
def splitConfigFile ():
    global config_file_dst, config_file_dst_first, config_file_dst_second,
emptyFirstFile, poap_script_log_handler
    configFile        = open("/bootflash/%s" % config_file_dst, "r")
    configFile_first  = open("/bootflash/%s" % config_file_dst_first, "w+")
    configFile_second = open("/bootflash/%s" % config_file_dst_second, "w+")
    line = configFile.readline()
    while line != "":
        if not string.find(line, "hardware profile portmode", 0, 25) or not
string.find(line, "hardware profile tcam", 0, 21):
            configFile_first.write(line)
            if emptyFirstFile is 1:
                emptyFirstFile = 0
        else:
            configFile_second.write(line)
        line = configFile.readline()

configFile.close()
    removeFile("/bootflash/%s" % config_file_dst)
    configFile_first.close()
    if emptyFirstFile is 1:
```

FIG. 12

```
Applying scheduled configuration...
Copy complete, now saving to disk (please wait)...
[########################################] 100%
Copy complete, now saving to disk (please wait)...
Done
User Access Verification
switch-poap login:
```

FIG. 13

DEPLOYMENT AND UPGRADE OF NETWORK DEVICES IN A NETWORK ENVIRONMENT

This Application is a continuation (and claims the benefit of priority under 35 U.S.C. § 120) of U.S. application Ser. No. 13/766,458, filed Feb. 13, 2013, entitled "DEPLOYMENT AND UPGRADE OF NETWORK DEVICES IN A NETWORK ENVIRONMENT," naming inventors Lucien M. Avramov et al. The disclosure of the prior application is considered part of (and is incorporated in its entirety by reference in) the disclosure of this application.

TECHNICAL FIELD

This disclosure relates in general to the field of communications and, more particularly, to deployment and upgrade of network devices in a network environment.

BACKGROUND

Data centers are increasingly used by enterprises for collaboration and for storing data and/or resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance. In such data centers and similar networking environments, automation, including in deployment and upgrade of network devices, can enable operational efficiencies.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is a simplified diagram illustrating other example details of the system in accordance with one embodiment;

FIG. 5 is a simplified diagram illustrating yet other example details of the system in accordance with one embodiment;

FIG. 6 is a simplified diagram illustrating yet other example details of the system in accordance with one embodiment;

FIG. 7 is a simplified diagram illustrating yet other example details of the system in accordance with one embodiment;

FIG. 8 is a simplified diagram illustrating yet other example details of the system in accordance with one embodiment;

FIG. 9 is a simplified diagram illustrating yet other example details of the system in accordance with one embodiment;

FIG. 10 is a simplified diagram illustrating yet other example details of the system in accordance with one embodiment;

FIG. 11 is a simplified diagram illustrating yet other example details of the system in accordance with one embodiment;

FIG. 12 is a simplified diagram illustrating yet other example details of the system in accordance with one embodiment;

FIG. 13 is a simplified diagram illustrating yet other example details of the system in accordance with one embodiment;

DETAILED DESCRIPTION OF EXAMPLE EMBODIMENTS

Overview

An example method for deployment and upgrade of network devices in a network environment includes receiving Dynamic Host Configuration Protocol (DHCP) information (e.g., at a switch being activated in the network environment from a DHCP server in the network environment). The DHCP information includes a filename and location of a script file. The method further includes downloading the script file (e.g., from a script server in the network environment) and executing the script file. Executing the script file includes copying a configuration file and one or more software images to a memory element of the switch, where the configuration file includes configuration settings relevant to at least a switch identity, and a switch location in the network environment, installing the software images on the switch, rebooting the switch, applying configuration settings from the configuration file to the software images, and saving the configuration file (e.g., to a random access memory in the memory element).

Example Embodiments

Figure 1:
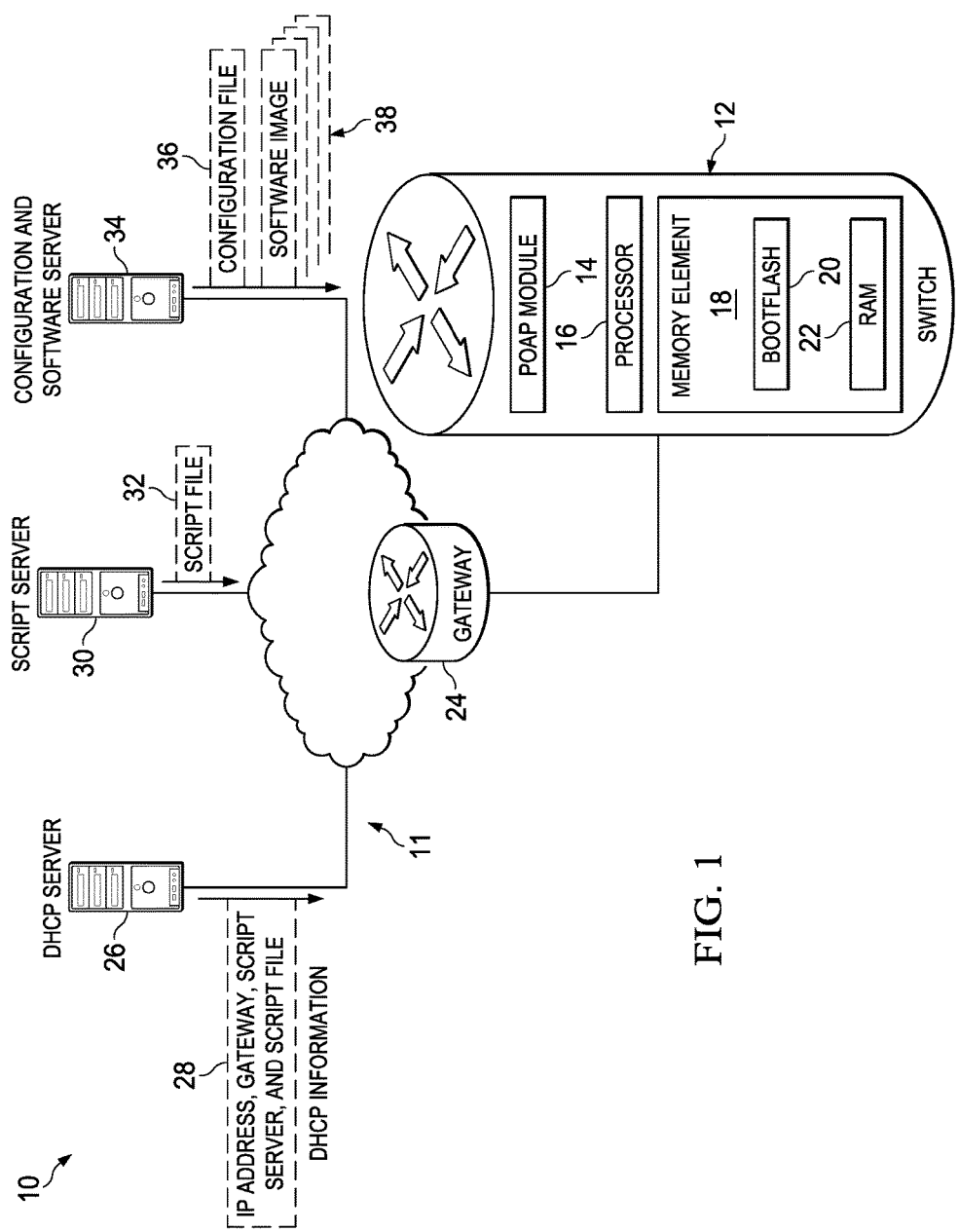
FIG. 1 is a simplified block diagram illustrating a system for deployment and upgrade of network devices in a network environment.

Turning to FIG. 1, FIG. 1 is a simplified block diagram illustrating a communication system 10 for deployment and upgrade of network devices in a network environment. FIG. 1 includes a network 11 (generally indicated by an arrow) comprising a switch 12. As used herein, the term "switch" includes a network element configured to receive, route, and forward packets from various other network elements within a network environment, such as network 11. The term "network element" is meant to encompass computers, network appliances, servers, routers, switches, gateways, bridges, load balancers, firewalls, processors, modules, or any other suitable device, component, element, or object operable to exchange information in the network environment. Moreover, the network elements may include any suitable hardware, software, components, modules, interfaces, or objects that facilitate the operations thereof. This may be inclusive of appropriate algorithms and communication protocols that allow for the effective exchange of data or information.

Switch 12 includes a Power-On-Auto-Provisioning (POAP) module 14, a processor 16, and a memory element 18 (among other components). Memory element 18 may include a bootflash 20 and a Random Access Memory (RAM) 22. Switch 12 may communicate via a gateway (e.g., router, another switch, etc.) 24 with a Dynamic Host Configuration Protocol (DHCP) server 26, from which switch 12 may obtain DHCP information 28, comprising, for example, Internet Protocol (IP) address, gateway identity, script server name, and script file details. Switch 12 may also communicate with a script server 30, from which switch 12 may obtain a script file 32. As used herein, the term "script file" includes a set of instructions, written in a scripting language, such as Python, Tool Command Language (TCL), etc., such that the set of instructions can be executed by processor 16 without compiling. The script file is not in binary format (e.g., compiled code, or executable code) and is capable of being interpreted (by the network element on which it is executing) from the source code. Switch 12 may further communicate with a configuration and software server 34, from which switch 12 may obtain a configuration file 36 and one or more software images 38.

As used herein, the term "configuration file" includes one or more files comprising initial settings for one or more computer programs. Configuration file 26 can be used to set switch processes and switch operating systems. The contents of configuration file 36 may vary with location (e.g., address, position, relative situation in the network topology, such as leaf, spine, etc.) and identity of switch 12, among other factors. In various embodiments, configuration file 36 may be written in ASCII (or UTF-8) and line-oriented, with lines terminated by a newline or carriage return/line feed pair, depending on the operating system. In other embodiments, configuration file 36 may be formatted as a simple database. Configuration file 36 may be generated by a user using appropriate tools (e.g., graphical user interfaces, text editor, etc.) and stored in configuration and software server 34. In some embodiments, configuration file 36 may be read once at startup. In other embodiments, configuration file 36 may be stored locally (e.g., in RAM 22) and read periodically, for example, when relevant software programs are initiated. In yet other embodiments, switch 12 may periodically download configuration file 36 to check for changes (e.g., script file 32 may be configured to instruct POAP module 14 to re-read configuration file 36 and apply the changes to currently executing processes).

As used herein, the term "software image" includes one or more files comprising contents and structure representing computer programs stored on a data storage medium (e.g., of configuration and software server 34). When the software image is installed (e.g., data for executing the computer programs written to a hard drive or other suitable memory element and the computer programs prepared for execution) on a network device, such as switch 12, the computer programs represented by the one or more files may become operational, and can execute instructions thereof. Software image 38 can include files representing kickstart (e.g., a composite file containing multiple different sections used to activate the software system of switch 12) and system binary files (e.g., contains software daemons and processes that execute the software system) used by the switch operating system for startup and booting (e.g., loading and running initial processes to create filesystems and to activate switch 12 for its regular operations).

According to various embodiments, communication system 10 may provide an intelligent deployment method, affording switch 12 the ability to make decisions based on end user scripted instructions represented in script file 32. The decisions can take into account network position and topology of switch 12 and network 11, respectively, including by way of example, and not limitation, switch identity, switch location, thermal information, or other information available on the switch. Communication system 10 may facilitate self discovery of DHCP server 26, automatic and control resolution of installation storm, installation and execution of automated instructions based on the location and identity of switch 12, self detection of location, live verification and communication of deployment process, and self communication to remove stations with the result after upgrade (among other features). In various embodiments, communication system 10 can provide an innovative deployment and upgrade functionality for network equipment at scale, not requiring end user intervention and allowing multiple tier network topologies to be deployed automatically. For example, switch 12 may be replaced without end user intervention with merely a physical notification regardless of the type of fabric (e.g., L2, L3) deployed in network 11.

For purposes of illustrating the techniques of communication system 10, it is important to understand the communications in a given system such as the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typically, at first deployment or replacement, network devices such as switches are connected to other network elements, upgraded, and configured. The configuration typically depends on several factors, including position (e.g., access, edge, gateway, leaf, spine, etc.), location (e.g., subnet, virtual local area network, etc.), and functionalities (e.g., Top-Of-Rack switch, Local Area Network (LAN) switch, Wide Area Network (WAN) switch, Media Access Control (MAC) filtering, Spanning Tree Protocols, Internet Protocol (IP) clustering, etc.) of the switch in the network. In currently existing network environments, each switch is manually connected, configured, and upgraded by the user, such as a system administrator or network administrator. In some network environments, after initial activation, a portion of the configuration may be remotely managed, for example, through a remote management system; however, the initial activation typically requires manual intervention. In massively scalable data centers, with a large number of switches, such manual process can lead to operational inefficiencies.

Some network environments permit automatic download and installation of the operating system on switches. Such automatic download and installation is a limited function whereby the switch does not locate its position in the network, and does not take post-install operations or live status updates allowing remote monitoring while the process is in progress. Moreover, such automatic installation is not customizable (e.g., via custom scripts), and is not generally applicable for massively scalable data centers, with substantially simultaneous automatic installation and upgrade of multiple devices.

Automatic installation and download of operating systems on servers and other virtual machines are also generally known. For example, Oracle SUN servers can boot over a local area network (LAN) or a wide area connection WAN. A programmable Read Only Memory (PROM) downloads the booter from a boot server or an install server located in the network. When booting over a LAN, the firmware uses DHCP to discover either the boot server or the install server. Trivial File Transfer Protocol (TFTP) is used to download the booter. When booting over a WAN, the firmware uses either DHCP or non-volatile Random Access Memory (NVRAM) properties to discover the install server, the router, and the proxies for the system to boot from the network, and downloads the booter using HTTP. In addition, the booter's signature is often checked with a predefined private key. However, such automatic download mechanisms do not apply to switches, where the configuration information depends on the switch location, identity, or other environmental variables, among other features.

Some automatic download and installation procedures with respect to servers use DHCP mechanisms for determining the IP address of the server from which to download boot files. In general, DHCP includes a sequence of messages that can be sent between DHCP clients and servers. The DHCP discover message is broadcast by a DHCP client when the DHCP client first attempts to connect to the network. The DHCP discover message typically requests IP address information from a DHCP server. In response to the DHCP discover message, the DHCP server that has an IP address configuration to offer to the client broadcasts a DHCP offer message to the DHCP client. The DHCP offer message typically contains an available IP address and additional network configuration information, such as the subnet mask and default gateway. More than one DHCP server can respond with a DHCP offer message. The DHCP client accepts (e.g., selects) the best offer, for example, the first DHCP offer message that it receives.

The DHCP client thereafter broadcasts a DHCP request message. The DHCP request message contains the IP address from the DHCP offer that was selected. Thereafter, the DHCP server typically broadcasts a DHCP acknowledgement (DHCP ACK) message to the DHCP client acknowledging the DHCP request message. The DHCP server also forwards any options with the DHCP ACK message. Upon receipt of the DHCP ACK message, the DHCP client can use the IP address to participate in the network and complete its system startup.

Unlike servers, switches typically require complex configuration settings to function appropriately in the network. For example, a Cisco Catalyst 6500 switch may need the following configurations to function appropriately: Router Mode with Multilayer Switch Feature Card (MSFC) on Client Side; Bridged Mode with the MSFC on Client Side; Probe configurations; Source Network Address Translation (NAT) for Server-Originated Connections to virtual IP (VIP) address; Session Persistence (Stickiness) settings; Direct Access to Servers in Router Mode; Server-to-Server Load-Balanced Connections; Route Health Injection; Server Names; Backup Server Farm settings; Load-Balancing Decisions Based on the Source IP Address; Layer 7 Load Balancing; HTTP Redirect; etc. Such configuration settings may vary with the position of the switch in the network and the network topology (among other factors). For example, a switch in a TRILL network may be configured differently from a switch in a ring topology; moreover, a leaf switch in the TRILL network may be differently configured from a spine switch in the same TRILL topology. The automatic download procedures applicable for servers and operating systems of switches typically do not handle such complex configuration scenarios.

Communication system 10 is configured to address these issues (and others) in offering a system and method for deployment and upgrade of network devices in a network environment. In various embodiments, POAP module 14 may automate the process of upgrading software images and installing configuration files on switch 12 that are being deployed in network 11 for the first time. The POAP process can include four phases: (1) power up; (2) DHCP discovery; (3) script execution; and (4) post-installation reload. When switch 12 is powered up for the first time, it loads any software image installed at manufacturing and tries to find a configuration file in bootflash 20 or RAM 22 (or other suitable memory element 18) from which to boot. When switch 12 does not find a startup configuration within itself (e.g., in bootflash 20), switch 12 may enter POAP mode. In some embodiments, user intervention may not be sought for POAP mode to continue. In other embodiments, a pop up window may inquire if the user wants the POAP mode. In POAP mode, DHCP discovery process is initiated. Substantially all network interfaces on switch 12 may be activated in a non-forwarding mode until completion of the DHCP discovery process.

During DHCP discovery process, switch 12 may send out DHCP discover messages (e.g., DHCPDISCOVER messages) on substantially all active interfaces (including the management interface, if any) soliciting DHCP offer messages from any DHCP server(s), including DHCP server 26. The DHCP discover messages may include the switch serial number and MAC address labeled on switch 12. In some embodiments, the switch make and model number (or name), or part number may be additionally (or alternatively) included in the DHCP discover messages. In some embodiments, a DCHP client on switch 12 can use the switch serial number in a client-identifier option to identify itself to DHCP server 26. DHCP server 26 can use the identifier to send DHCP information 30 back to the DHCP client on switch 12.

In various embodiments, the DHCP discover message can also solicit the server address or name of script server 30 and bootfile name (including name of script file 32) from DHCP server 26. DHCP server 26 may relay the server name or server address and the bootfile name in DHCP information 28 to the DHCP client on switch 12. In some embodiments, DHCP information 28 may be included in the DHCP offer message from DHCP server 26. In other embodiments, DHCP information 28 may be included in the DHCP ACK message from DHCP server 26. The DHCP client may use DHCP information 28 to contact script server 30 and obtain script file 32. The bootfile name can include the complete path to the bootfile (which may be included in script file 32 in some embodiments) on script server 30. The DHCP client on switch 12 can use the bootfile name to download script file 32.

In some embodiments, when multiple DHCP offer messages are received (for example, from multiple DHCP servers in network 11), a single DHCP offer message may be randomly chosen. Switch 12 may complete the DHCP negotiation (e.g., including request and acknowledgment) with selected DHCP server 26, and DHCP server 26 may assign an IP address to switch 12. If there is a failure in any of the subsequent steps in the POAP process, the IP address can released back to DHCP server 26. If no DHCP offer messages meet expectations (e.g., as pre-configured in POAP module 14, for example, where the DHCP offer does not include DHCP information 28), switch 12 may not complete the DHCP negotiation and an IP address may not be assigned.

In some embodiments, where multiple switches transmit queries for existence, a master server may orchestrate responses. In the absence of an acknowledgement, a retry with timer may be applied with N tries (e.g., as configured by the user). The DHCP offer messages from multiple DHCP servers may be issued in a staggered manner based on a pre-defined schedule. Unknown (or undiscovered) devices in network 11 may be re-timed to a different pace or placed idle by a specific DHCPOFFER message with a specific option. Co-ordination of activation of multiple switches may be automated through the remote master server in some embodiments. According to various embodiments, switch connectivity (e.g., to other switches and servers) may be inactive until the POAP process has completed. The amount of traffic generated on network 11 for the POAP activities may be under 1% of the switch capacity load in some embodiments.

In some embodiments, the master server may be informed of the switch identity by the switch unique router MAC address and the switch serial number. The master server may provide to DHCP server 26 (for including in DHCP information 28) the IP address of switch 12, the address (e.g., IP address, uniform resource locator (URL) of a hypertext transfer protocol (HTTP) server, etc.) of script server 30, and activate live verification and communication deployment process, followed (in some embodiments) by a post-upgrade process for forwarding on to switch 12. According to various embodiments, switch 12 (and other participating switches) may receive the DHCP offer message (or DHCP ACK message) including various options specifying DHCP information 28. For example, the options may specify the name (or address) of script server 30, the communication method (e.g., TFTP, file transfer protocol (FTP) hypertext transfer protocol (HTTP), etc.) for downloading script file 32, etc.

Switch 12 may contact script server 30 and download script file 32 (e.g., using TFTP or HTTP or other communication protocol as specified in DHCP information 28) and store it locally within memory element 18. Script file 32, when executed by switch 12, may retrieve the switch-specific identifier, for example, the serial number, download software images 38 (e.g., system and kickstart images) and configuration file 36 if they do not already exist on bootflash 20 in switch 12, install software images 38 on switch 12 and store them in RAM 22 for the next reboot, schedule the downloaded configuration file 36 to be applied at the next switch reboot, and store configuration file 36 in RAM 22 as the startup-configuration for the next reboot. As used herein, the term "reboot" includes restarting switch 12, including executing initial processes for startup.

Script file 32 may include automated instructions relevant to location and identity of switch 12. Script file 32 may be pre-configured by the user (e.g., system administrator, network administrator, etc.) before download by switch 12. Pre-configuration can include specifying various relevant information, such as: the filenames and locations of configuration file 36 and software images 38; method of downloading configuration file 36 and software images 38; local storage location and naming conventions on switch 12; configuration process; software upgrade process; and various other POAP process settings.

In some embodiments, script file 32 may include a signature, such as a hash key, for checking file integrity. In other embodiment, DHCP server 26 may provide the hash key. For example, an MD5 checksum can be included in script file 32, or provided by DHCP server 26. The MD5 checksum can be validated to confirm integrity of script file 32. If the MD5 matches, the POAP process may continue. In some embodiments, if the MD5 fails, script file 32 may be downloaded again, and the process repeated, until the MD5 matches. In other embodiments, if the MD5 fails, the POAP process may begin anew with a new DHCP discover message. In some embodiments, switch 12 may inform DHCP server 26 (or a master server, as appropriate) whether verification and/or execution of script file 32 was successful. Such notification may be implemented using any suitable mechanism, including Simple Network Management Protocol (SNMP), SYSLOG, etc. Information pertaining to execution of script file 32 may be stored in bootflash 20 in switch 12.

On successful completion of the validation, or on the failure of the validation, the corresponding result can be stored in an internal non-volatile state (e.g., in memory element 18). Additionally (or alternatively), the result can be relayed to the remote management servers in network 11. In some embodiments, the relaying can be performed while the POAP process on switch 12 is being executed. The result can be further used to trigger a restart of the provisioning if failures or incomplete operations were detected. In some embodiments, the success or failure of the POAP process may be visually displayed on switch 12, for example, with LED lighting up when POAP process is complete.

In some embodiments, on discovery of remote management servers (e.g., master server), switch 12 can forward status information about specific operations to one or more such remote management servers. The status information can be qualified by any unique identifier (e.g., serial number, MAC address, etc.) of switch 12 in network 11. The unique identifier can be further used to filter and/or organize the status information on the remote management servers. In some embodiments, switch 12 may buffer (e.g., aggregate and store locally) the status information and the buffered logs may be delivered to the remote management servers later as appropriate.

In some embodiments, the log files may be stored on bootflash 20, in a predefined format (e.g., YYMMDD_poap_PID_script.log, indicating log file of script execution; YYMMDD_poap_PID_init.log, indicating log file of operations prior to executing script file 32; etc.) Script file 32 may be modified suitably to change the format of the log files. In an example script file 32, the appropriate command line may be modified to poap_script_log="/bootflash/%s_poap_%s_script.log" % (strftime("%Y%m%d%H%M%S", gmtime( )), os.environ['POAP_PID']). It is also possible to write custom messages within the log file (e.g., poap_write_to_file(poap_script_log_handler, "\nINFO: PoAP on Nexus Series Rocks!"). At any time, it is possible to abort the POAP process, complete the basic setup steps and login switch 12 to retrieve the log files stored in bootflash 20. In some embodiments, only a limited number (e.g., 5) log files may be saved in bootflash 20 (e.g., to reduce storage space requirements).

In some embodiments, configuration file 36 may not be applied to switch 12 immediately, for example, where the software image currently running on switch 12 does not support all of the commands in configuration file 36. In such embodiments, the newly downloaded software images 28 may execute after switch 12 reboots. Subsequently, or alternatively substantially simultaneously, configuration file 36 may be applied to software images 38 on switch 12. If switch 12 loses connectivity, execution of script file 32 may stop, and switch 12 may reload software images 38 and bootup variables already present therein. Subsequent to configuring software images 38, switch 12 may copy the executing configuration file 36 to its startup configuration.

In some embodiments, prior to executing script file 32, switch 12 may detect network neighbors, for example, using Cisco Discovery Protocol (CDP) or Link Layer Discovery Protocol (LLDP) or other suitable protocol. Detecting neighbors may include detecting links connected to neighbors, the type of links used by neighbors to connect to switch 12, serial numbers of neighbors, hostnames of neighbors, MAC addresses of neighbors, software versions of neighbors, operating systems of neighbors, etc. The detected information may be stored locally in memory element 18 and can be used by script file 32 during execution.

In some embodiments, after activation and upgrade, switch 12 may initiate communication of state information to the remote management servers. The state information can include configuration, reachability and other aspects of provisioning related to switch 12. Pre-determined actions (or script files) may be downloaded or dynamically pre-built as a part of the script provisioning process for the state information communication. The set of actions (or script files) can be specific to switch 12 or generic to substantially all similar network elements within network 11. In some embodiments, switch 12 may be pre-configured to detect the completion of provisioning (e.g., POAP process). When completion of provisioning is detected, a pre-defined set of actions (or script files) may be generated and/or executed in switch 12. The actions may include validating the specific configuration of switch 12, for example, by comparing it to a reference configuration and validating the reachability of a default gateway (e.g., gateway 24).

POAP module 14 may provide an intelligence mechanism to switch 12 in network 11 to self-configure and upgrade based on its physical location and neighbors, facilitating automated initial network deployment, and smart upgrades, triggered by network management without direct user intervention on switch 12. Embodiments of communication system 10 may enable automation, address scale deployments and upgrades of thousands of network devices in the network, and allow customizable interfaces with HTTP. The upgrade method according to various embodiments can use any ports (e.g., inband or outband, or USB, etc.). The operations described herein are not limited to the type of network fabric (e.g., L2, L3). Embodiments of communication system 10 may be simple to use, relying on industry standard protocols and adapted to different management tools, such as TFTP, FTP, secure FTP (SFTP), HTTP protocols, etc. Alterations to existing activation procedures or switch behavior may not be needed, for example, normal boot up factory process may be used if so desired by the end user.

Turning to the infrastructure of communication system 10, the network topology can include any number of servers, gateways, switches, and other network elements inter-connected to form a large and complex network 11. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of data packets in a network. Communication system 10 may also operate in conjunction with a User Datagram Protocol/Internet Protocol (UDP/IP) or any other suitable protocol, where appropriate and based on particular needs.

The example network environment may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, DHCP server 26, script server 30 and configuration and software server 34 may be implemented in a single physical network element, for example, as separate virtual machines, server applications, etc. In other embodiments, one or more of DHCP server 26, script server 30 and configuration and software server 34 may be implemented in separate physical network elements, communicating with each other over physically distinct communication links. Gateway 24 may be a suitable router, or switch, configured to forward data from one network element to another. Bootflash 20 may include a flash memory device used primarily to store boot software image and system configuration information. RAM 22 may include any suitable RAM device, including dynamic RAM (DRAM) and static RAM (SRAM).

In various embodiments, POAP module 14 may be an application installed on switch 12 during manufacturing, or after manufacturing and before activation of switch 12 in network 11. An "application" as used herein this Specification, can be inclusive of an executable file comprising instructions that can be understood and processed on a computer, and may further include library modules loaded during execution, object files, system files, hardware logic, software logic, or any other executable modules. POAP module 12 may include a DHCP client and other functionalities for performing the operations described herein.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that the communication system 10 shown in FIG. 1 is simplified for ease of illustration.

Figure 2:
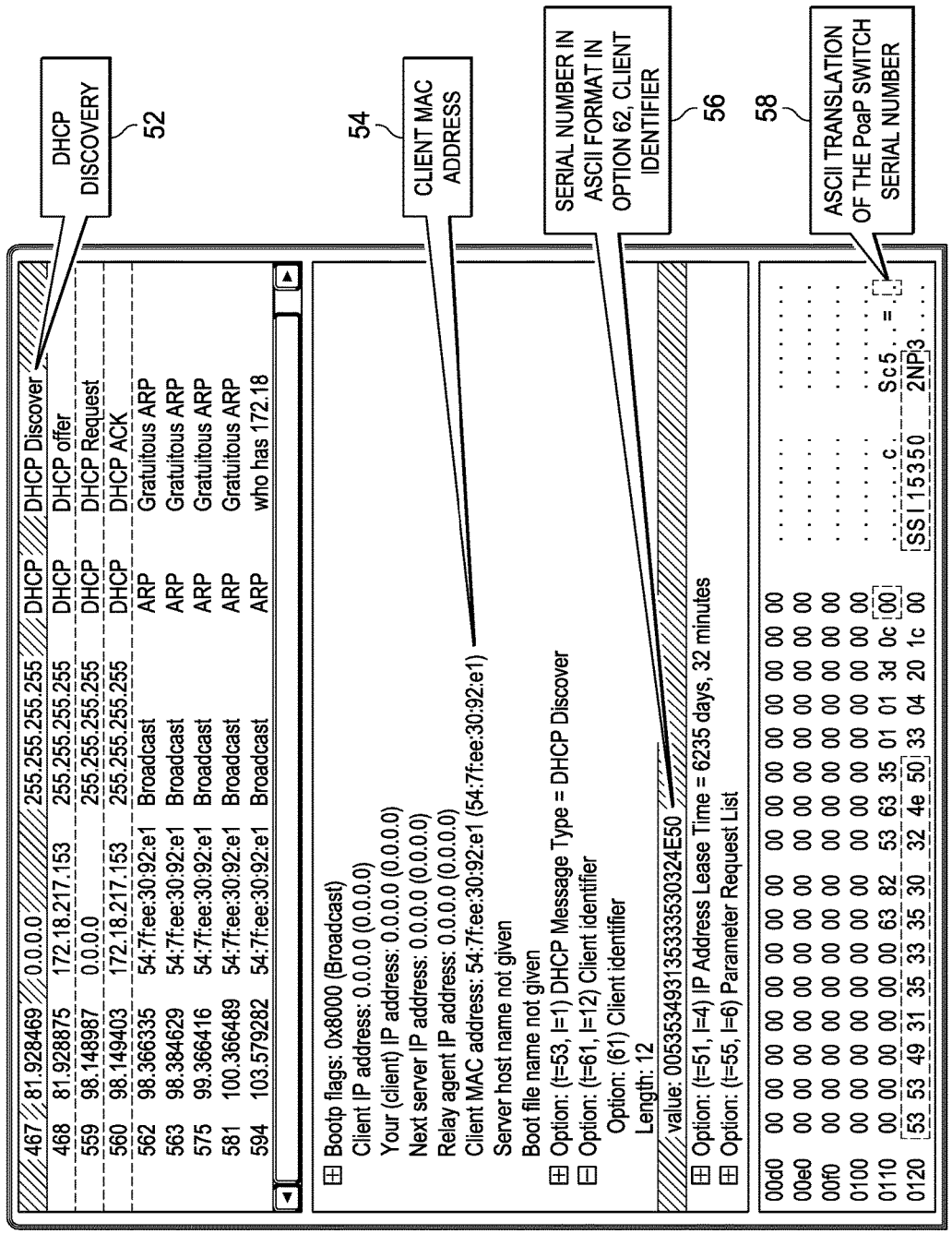
FIG. 2 is a simplified diagram illustrating example details of the system in accordance with one embodiment.

Turning to FIG. 2, FIG. 2 is a simplified diagram illustrating a packet capture 50 on DHCP server 26 during a start-up phase of the POAP process according to an embodiment of communication system 10. Packet capture 50 indicates a DHCP discover message 52, showing a client MAC address 54 (e.g., 54:7f:ee:30:92:e1); a serial number 56 in ASCII format (e.g., 00 53 53 49 31 35 33 35 30 32 4E 50) that can identify switch 12; and an ASCII translation 58 (e.g., SSI15350 2NP3) of switch serial number 56. It may be noted that the example values indicated in the FIGURE are merely for illustrative purposes, and are not intended to be limitations of embodiments of communication system 10.

Figure 3:
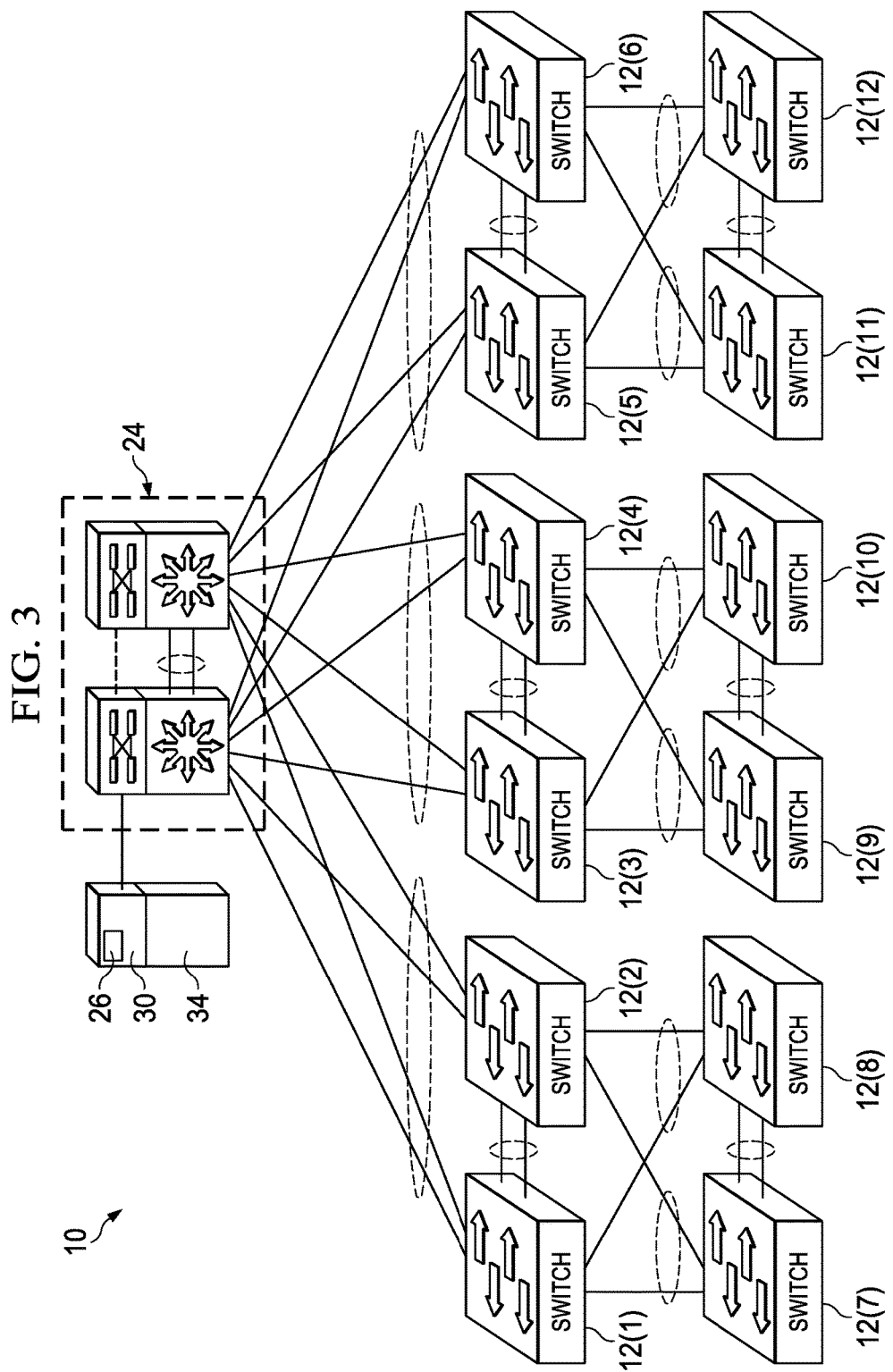
FIG. 3 is a simplified block diagram illustrating further example details of the system in accordance with one embodiment.

Turning to FIG. 3, FIG. 3 is a simplified diagram illustrating an example network topology according to an embodiment of communication system 10. Switches 12(1)-12(6) may be disposed on a first layer of network 11, and switches 12(7)-12(12) may be disposed on a second layer of network 11, such that switches in the second layer may communicate with gateway 24 only through switches in the first layer. In such network topology, switches 12(1)-12(6) in the first layer may self-activate prior to self-activation of switches 12(7)-12(12) in the second layer. Moreover, switches 12(1)-12(6) in the first layer may determine that they are located in the first layer, and that there are other switches 12(7)-12(12) located in the second layer, to which they are connected via link aggregation (virtual Portchannel (vPC), EtherChannel) or other network architecture. It may be noted that although only six switches are illustrated in each of two layers of the network topology, any number of switches and layers may be included in network 11 in any suitable topology (e.g., spine/leaf topology, TRILL networks, etc.) within the broad scope of the embodiments.

DHCP server 26, script server 30 and configuration and software server 34 may be co-located on a single physical server according to some embodiments. Gateway 24 may comprise a pair of switches in vPC configuration with switches 12(1)-12(6) in the first layer. Switches 12(7)-12(12) may comprise Top-Of-Rack switches that are coupled to other servers as a ppropriate.

According to various embodiments, switches 12(1)-12(6) may initiate the POAP process substantially simultaneously. (Switches 12(7)-12(12) may also initiate the POAP process substantially simultaneously with switches 12(1)-12(6); however, because switches 12(1)-12(6) may not be fully operational during the POAP process, network connectivity of switches 12(7)-12(12) with gateway 24 may not be established, and consequently, the POAP process may fail until switches 12(1)-12(6) are operational). Each of switches 12(1)-12(6) may substantially simultaneously broadcast DHCP discover messages, and DHCP server 26 may respond to each switch 12(1)-12(6) with separate DHCP information 28, as appropriate. Each of switches 12(1)-12(6) may substantially simultaneously download respective script file 32 from script server 30, and execute respective script file 32 locally. Separate (and distinct) configuration files 36 and software images 38 may be downloaded from configuration and software server 34 as appropriate substantially simultaneously by switches 12(1)-12(6). Other operations as described herein may also be executed substantially simultaneously by switches 12(1)-12(6).

Subsequent to self-configuration of switches 12(1)-12(6), switches 12(7)-12(12) in the second layer may initiate the POAP process substantially simultaneously. In some embodiments, switches 12(7)-12(12) may detect that neighbor switches 12(1)-12(6) are operational and that network connectivity to gateway 24 can be established. In other embodiments, after switches 12(1)-12(6) are operational, they may forward DHCP discover messages broadcast by switches 12(7)-12(12) to DHCP server 26. In yet other embodiments, a remote management server may power up switches 12(7)-12(12) after receiving status notification from switches 12(1)-12(6) that they have completed activation. Various other scenarios for initiating the POAP process by switches 12(7)-12(12) may be included within the broad scope of the embodiments.

Turning to FIG. 4, FIG. 4 is a simplified diagram illustrating an example DHCP configuration file 60 according to an example embodiment of communication system 10. Information included in DHCP configuration file 60 may be included in DHCP information 28, for example, according to DHCP standards. DHCP server 26 may be pre-configured with DHCP configuration file 60 in some embodiments. Various options may be included in DHCP configuration file 60 for downloading script file 32. For example, DHCP configuration file 60 may indicate that script file 32 can be downloaded via TFTP from script server 30 located at 10.10.1.50 in the network. The name of script file 32 to be downloaded may be poap_script.py as specified in example configuration file 60. Note that the example script name is not intended to be a limitation of embodiments of communication system 10. Any filename and location may be used within the broad scope of the embodiments.

Turning to FIG. 5, FIG. 5 is a simplified diagram illustrating example details of an MD5 checksum verification mechanism according to an embodiment of communication system 10. The POAP process can match the script file MD5 against its definition 62 in script file 32. Example definition 62 specifies that the MD5 value should be "d1fd3449f5285d90070bfd04d98e9bd1." In some embodiments, to find the MD5 size of script file 32, an example Linux command "md5sum" can be used (with the user editing script file 32 to add the md5sum of script file 32) as indicated by commands 63.

To bypass the MD5 checksum verification, #md5sum line from script file 32 may be simply removed. In some embodiments, the POAP process may remove the MD5 sum line from script file 32 before calculating the MD5 sum of script file 32, for example, to ensure compliance between the value entered in script file 32, and the script file md5 value before adding the comment.

Turning to FIG. 6, FIG. 6 is a simplified diagram illustrating an example set 64 of configuration settings associated with configuration and software server 34. Example set 64 may be included in script file 32, for example, in a section called "host name and user credentials." The "hostname" variable in example set 64 may specify the IP address (e.g., 192.168.1.1) of configuration and software server 34 with login credentials of user (username) and cisco (password). In other embodiments, configuration and software server 34 may be specified by any unique identifier, for example, a device name, serial number, etc., using which switch 12 can communicate with configuration and software server 34.

Turning to FIG. 7, FIG. 7 is a simplified diagram illustrating an example code 66 for selecting configuration file 36 from configuration and software server 34. The configuration activities in the POAP process can include identifying appropriate configuration file 36 for download by switch 12 and the download process of configuration file 36 from configuration and software server 34 via a suitable method (e.g., FTP or Secure Copy Program (SCP)). In various embodiments, configuration file 36 may be applied after the software upgrade process completes, for example, after the reload has been performed.

The logic to determine appropriate configuration file 36 for download may be specified in script file 32, for example, by setting an appropriate variable (e.g., "poap_config_file_mode") according to example code 66. According to one example embodiment, a given configuration file name may be provided in script file 32, and switch 12 may download configuration file 36 according to the specified filename syntax. According to another example embodiment, switch 12 can utilize the neighbor information of the interface after the DHCP offer message is received from DHCP server 26. The CDP neighbor information can include the interface number, the serial number, hostname or upstream interface number of configuration and software server 34. According to yet another example embodiment, switch 12 may use its router MAC address (which may be unique per switch) to download configuration file 36 that includes the MAC address as a switch serial number. In some embodiments, the serial number mechanism may be set to be the default mechanism for determining configuration file 36.

In an example embodiment, the option to choose configuration file 36 according to the switch serial number may be specified in the configuration file name, for example, as conf_SERIALNUMBER.cfg. For example, conf_SSI1453ATSM.cfg may be a file located on configuration and software server 34 in the directory provided by script file 32. The file may contain the output of a show run for switch 12. Only switch 12 that has the serial number SSI1453ATSM can download configuration file 36 named conf_SSI1453ATSM.cfg. In various embodiments, the filename syntax can be changed in script file 32.

If substantially all switches 12 in network 11 are to use the same filename for configuration file 36, or if there is a logic in DHCP server 26 to provide different script files 32 to the different switches in network 11 (e.g., based of serial number or router MAC address), then a static filename can be used to determine appropriate configuration file 36.

Turning to FIG. 8, FIG. 8 is a simplified diagram illustrating another example code 68 that can be used to determine configuration file 36 according to neighbor information detected by switch 12. In example code 68, the "/" in the intfName variable may be changed to "_" based on the neighbor information. For example, if the DHCP offer message was received on interface Ethernet 1/10, the interface name eth1/10 may be changed to eth1_10, and the filename switch 12 may use to attempt to download may be 'conf_eth1_10.cfg.' In most operating systems, it is generally not possible to create a file with "l" in the filename; therefore, the filename may be based on the interface name in some embodiments.

Turning to FIG. 9, FIG. 9 is a simplified diagram illustrating an example software image definition 70 according to an embodiment of communication system 10. The software upgrade activities in the POAP process may be defined in script file 32 in a specific section, for example, called "System and Kickstart image info" in example software image definition 70 or by any other suitable name. The directory path in configuration and software server 34 may be specified in the section with a suitable variable (e.g., 'image_path'). In some embodiments, depending on the operating system of switch 12, files that activate and execute the software system of switch 12 may include more than one definition. For example, such files may be specified by the source filename (e.g., filename on configuration and software server 34 pointing to the kickstart of system binary files), and the destination filename (e.g., filename structure used to save the kickstart and system image files on bootflash 20 in switch 12). In an example embodiment, the source and destination filenames can be identical. In another example embodiment, the source and destination filenames can be different and configurable, based on user convenience.

According to some embodiment, the user can define timeout values for the download operation from configuration and software server 34. In some embodiments, by default, if software images 38 exist on bootflash 20, they are not downloaded again. In other embodiments, the download operation can be performed irrespective of existence of any software images 38 on bootflash 20 by overwriting the files, for example, by changing a value (e.g., 0 to 1) of one or more specific variables (e.g., "_image_copied"). In example software image definition 70, the variables that can be modified by the user in script file 32 include: image_path, system_image_src, system_image_dst, system_image_copied, kickstart_image_src, kickstart_image_dst, kickstart_image_copied, config_timeout, system_timeout, kickstart_timeout. Note that the variable names are provided herein merely for example purposes, and are not intended to be limitations of embodiments of communication system 10. Any suitable name and number of variables may be defined in script file 32 according to the broad scope of the embodiments.

Turning to FIG. 10, FIG. 10 is a simplified diagram illustrating an example algorithm 72 for copying configuration file 36 and software images 38 according to an embodiment of communication system 10. In an example embodiment, POAP module 14 may check for available free space (e.g., 150 MB) in bootflash 20 of switch 12, prior to attempting to download configuration file 36 and software images 38. The amount of available free space may be changed by the user by modifying script file 32 appropriately. Example algorithm 72 may be implemented in script file 32 and changed by the user, if needed, according to particular configurations. In example algorithm 72, a log file may be generated to indicate the status of the copy and install process.

Turning to FIG. 11, FIG. 11 is a simplified diagram illustrating another example algorithm 74 for copying configuration file 36 and software images 38 according to an embodiment of communication system 10. Configuration file 36 and software images 38 may be located in a library and may be transferred using FTP (or other suitable protocol). Global login information (e.g., username and password) may be provided in script file 32. Example algorithm 74 may fail if the destination files do not exist on configuration and software server 34, or are not downloadable (e.g., due to insufficient access permissions or other reasons).

Turning to FIG. 12, FIG. 12 is a simplified diagram illustrating an example algorithm 76 for splitting configuration file 36 according to an embodiment of communication system 10. In various embodiments, configuration file 36 may be split into two parts, with a first part comprising configuration settings (e.g., port-profile changes) that are activated upon a reboot of switch 12; and a second part comprising configuration settings that may not require a reboot of switch 12.

Turning to FIG. 13, FIG. 13 is a simplified diagram illustrating an example console message 78 according to an embodiment of communication system 10. After configuration file 36 and software images 38 have been downloaded, switch 12 may be reloaded with downloaded software images 38 and configurations from configuration file 36 may be applied. Example console message 78 may notify of the status of the POAP configuration process, by displaying "applying scheduled configuration" when the configuration settings are being applied. A copy of the running-configuration to the startup-configuration in RAM 22 may follow and the message "copy complete" may be displayed. Compliance between existing operating system and other software on switch 12 and the running configuration applied from downloaded configuration file 36 may be achieved, as new features or different configuration methods can be used related to the version of downloaded software images 38. After the POAP configuration process has completed, a message "done" may be displayed, and further prompts for user login may be provided, if needed. Any suitable message (including message type and format) may be displayed appropriately according to the broad scope of the embodiments of communication system 10.

Figure 14:
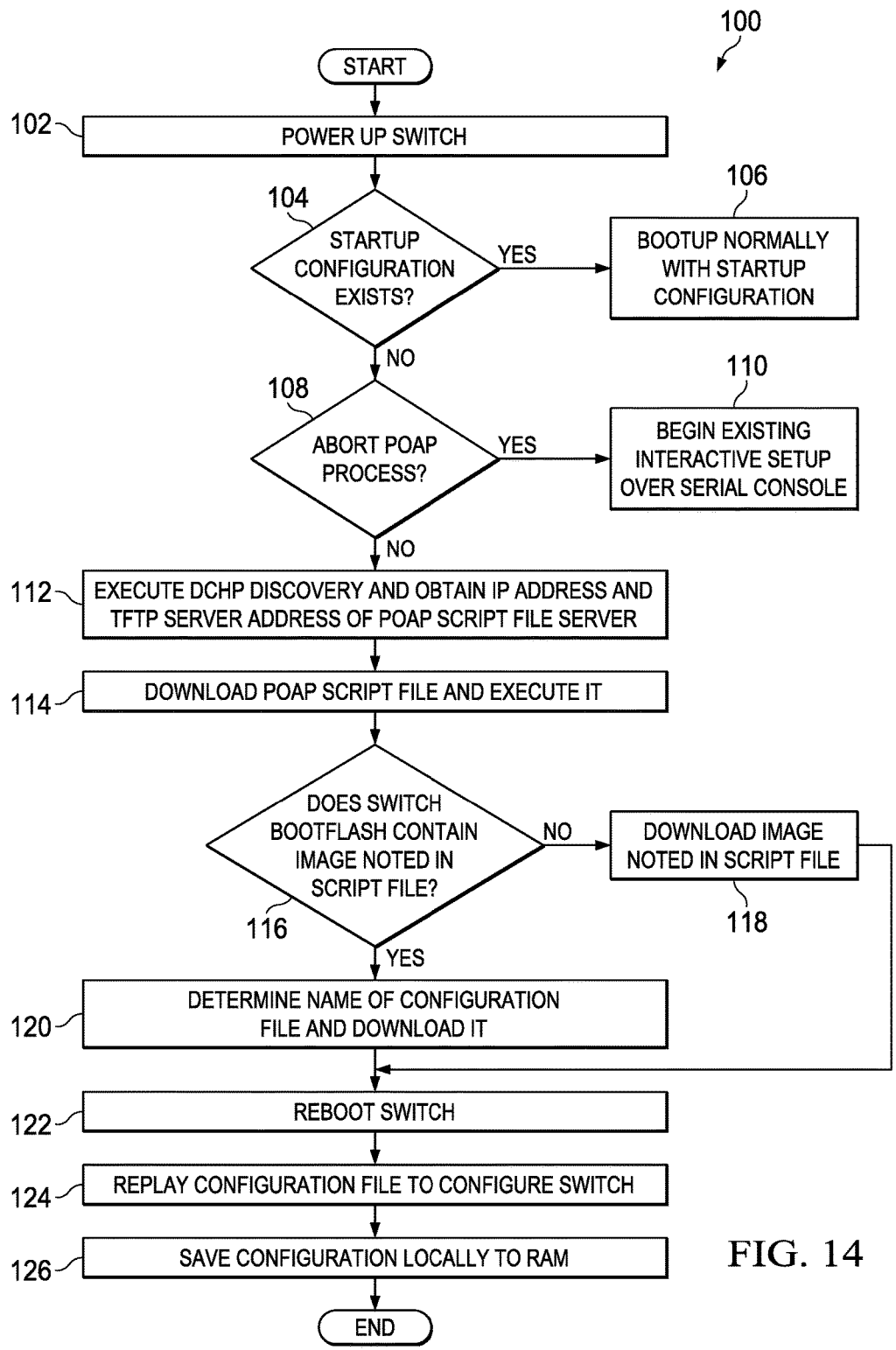
FIG. 14 is a simplified flow diagram illustrating example operations that may be associated with an embodiment of the system.

Turning to FIG. 14, FIG. 14 is a simplified flow diagram illustrating example operations 100 that may be associated with POAP module 14 according to an embodiment of communication system 10. At 102, switch 12 may be powered up. At 104, switch 12 may make a determination whether the startup configuration exists on bootflash 20. If the startup configuration exists on bootflash 20, at 106, switch 12 may bootup normally (without using the POAP process) with the startup configuration. If the startup configuration does not exist on bootflash 20 at 104, a determination may be made at 108 whether the POAP process may be aborted. If the POAP process is to be aborted, an interactive setup over serial console may be started at 110. Such a process may require direct user intervention. If the POAP process is not to be aborted at 108, at 112, DHCP discovery may be executed, for example, by broadcasting DHCP discover messages, receiving DHCP offer messages; sending DHCP request messages and receiving DHCP ACK messages. In an example embodiment, switch 12 may obtain the IP address and TFTP (or HTTP, or SFTP, or FTP, etc.) address of script server 30 (also referred to as POAP script file server).

At 114, script file 32 may be downloaded by POAP module 14 and executed. At 116, a determination may be made whether bootflash 20 in switch 12 contains image(s) noted in script file 32. If bootflash 20 does not contain image(s) noted in script file 32, software images 38 noted in script file 32 may be downloaded from configuration and software server 34 at 118. If bootflash contains image(s) noted in script file 32, the name of configuration file 36 may be determined and configuration file 36 may be downloaded from configuration and software server 34 at 120. At 122, switch 12 may be rebooted (automatically, without user intervention). At 124, configuration file 36 may be replayed (e.g., applied to software images 38) to configure switch 12. At 126, the configurations (e.g., in configuration file 36 may be saved locally to RAM 22 in switch 12.

Figures 15, 16:
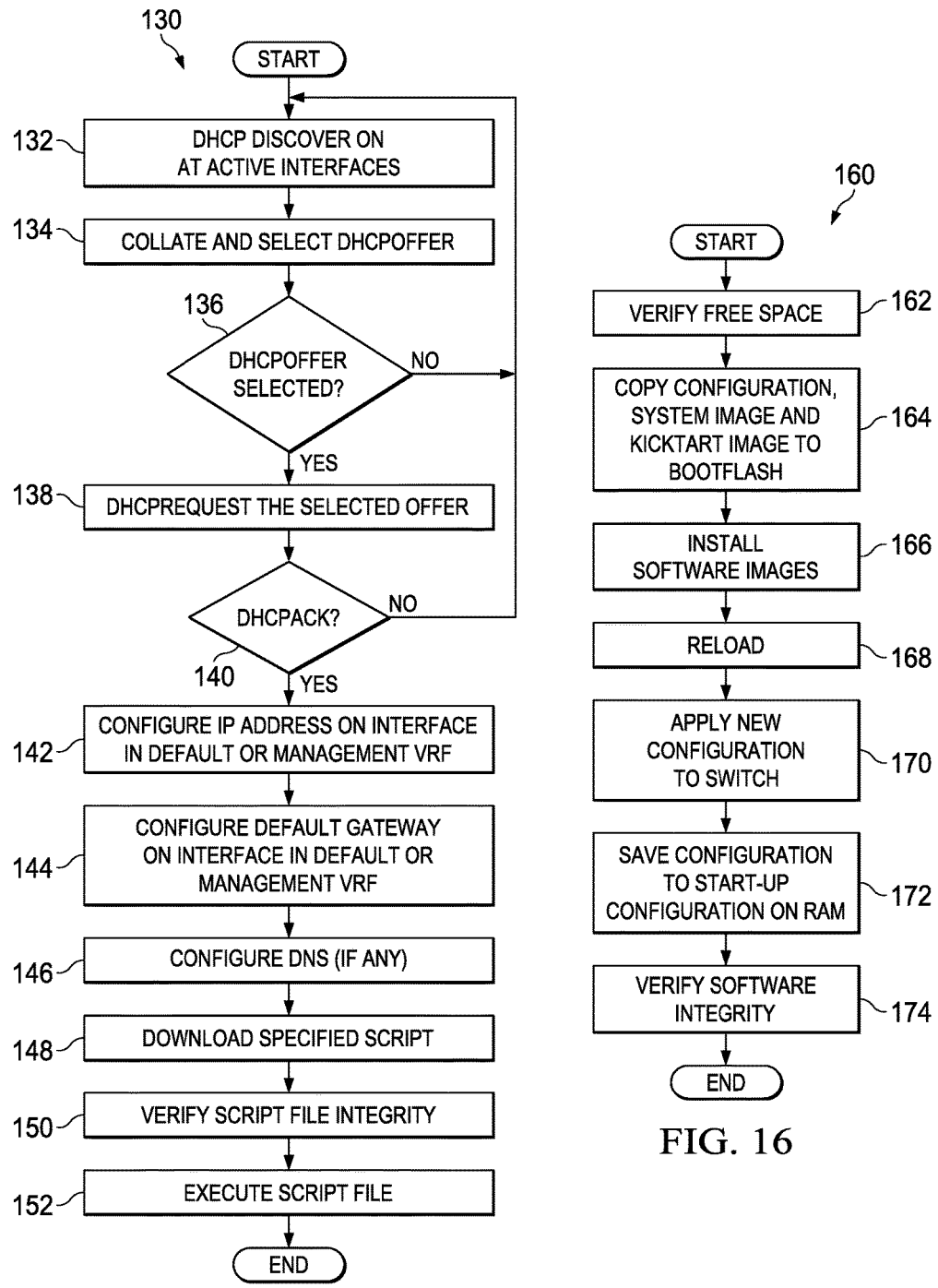
FIG. 15 is a simplified flow diagram illustrating further example operations that may be associated with an embodiment of the system.
FIG. 16 is a simplified flow diagram illustrating further example operations that may be associated with an embodiment of the system.

Turning to FIG. 15, FIG. 15 is a simplified diagram illustrating example operations 130 associated with DHCP discovery according to an embodiment of communication system 10. At 132, DHCP discovery may be turned on at active interfaces of switch 12, and appropriate DHCP discover messages may be broadcast therefrom. At 134, one or more DHCP offer messages may be received, collated and a specific DHCP offer message may be selected. At 136, a determination may be made whether a DHCP offer message has been selected. If not, the operations may step back to 132, and DHCP discovery messages may be broadcast yet again. If a DHCP offer message has been selected, at 138 a DHCP request message corresponding to the selected DHCP offer message may be broadcast. At 140, a determination may be made whether a DHCP ACK message has been received. If not, the operations may step back to 132, and DHCP discover messages may be broadcast yet again.

If a DHCP ACK message has been received, at 142, the IP address of switch 12 received from DHCP server 26 may be configured on the interfaces (for example, in default or management virtual routing and forwarding (VRF). At 144, the default gateway (e.g., gateway 24) may be configured on the interfaces (e.g., in default or management VRF). At 146, domain name system (DNS), if any, may be configured with the IP address. At 148, script file 132 specified in the DHCP offer message may be downloaded from the specified script server 30. At 150, the script file integrity may be verified. At 152, the script file may be executed.

Turning to FIG. 16, FIG. 16 is a simplified diagram illustrating example operations 160 that may be associated with the POAP process according to an embodiment of communication system 10. At 162, POAP module 14 may verify available free space in switch 12 against space requirements configured in script file 32. At 164, configuration file 36, and software images 38 (including kickstart image and system image) may be copied to bootflash 20. At 166, software images 38 may be installed in switch 12. At 168, switch 12 may be rebooted, and software images 38 may be reloaded. At 170, new configuration settings from configuration file 36 may be applied to software images 38. At 172, configuration file 36 may be saved as the startup configuration on RAM 22. At 174, the software integrity may be verified.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In example implementations, at least some portions of the activities outlined herein may be implemented in software in, for example, POAP module 14. In some embodiments, one or more of these features may be implemented in hardware, provided external to these elements, or consolidated in any appropriate manner to achieve the intended functionality. The various network elements (e.g., switch 12, DHCP server 26, script server 30, configuration and software server 34, etc.) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switch 12, DHCP server 26, script server 30, configuration and software server 34 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some example embodiments, one or more memory elements (e.g., memory element 18) can store data used for the operations described herein. This includes the memory element being able to store instructions (e.g., software, logic, code, etc.) in non-transitory tangible media, such that the instructions are executed to carry out the activities described in this Specification. A processor can execute any type of instructions associated with the data to achieve the operations detailed herein in this Specification. In one example, processors (e.g., processor 16) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory element 18) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A Power-On-Auto-Provisioning (POAP) method of self-activating a switch in a network, comprising:
    broadcasting, from a network interface of the switch upon powering up, a Dynamic Host Configuration Protocol (DHCP) discover message;
    receiving a DHCP offer message in response to the DHCP discover message, the DHCP offer message comprising names of a script file and a script server hosting the script file, the script file comprising a plurality of instructions in script language that can be executed by a processor of the switch without compiling, wherein the instructions specify a configuration file relevant to the switch;
    broadcasting a DHCP request message corresponding to the DHCP offer message;
    receiving a DHCP acknowledgement message in response to the DHCP request message, the DHCP acknowledgement message comprising an Internet Protocol (IP) address of the switch; downloading the script file from the script server; and
    automatically executing the script file.

2. The method of claim 1, wherein the script file includes filenames and locations of the configuration file and software images relevant to the switch, method of downloading the configuration file and software images, local storage location and naming conventions on the switch, configuration processes, and software upgrade processes.

3. The method of claim 2, wherein the method of downloading the configuration file and software images is specified as a Trivial File Transfer Protocol (TFTP) process.

4. The method of claim 2, wherein the script file further includes a hash key indicative of an integrity of the script file.

5. The method of claim 4, further comprising:
    verifying the integrity of the script file using the hash before executing the script file, wherein the script file is repeatedly downloaded until the integrity is successfully verified.

6. The method of claim 1, further comprising:
    receiving a plurality of DHCP offer messages; and
    randomly selecting the DHCP offer message from the plurality of DHCP offer messages.

7. The method of claim 1, further comprising:
discovering network neighbors of the switch in the network prior to executing the script file; and
storing information of the network neighbor locally in the switch.

8. The method of claim 1, further comprising:
configuring the IP address on the network interface of the switch;
configuring a default gateway on the network interface; and
configuring a domain name system (DNS) with the IP address.

9. The method of claim 1, further comprising:
communicating state information to remote management servers in the network,
wherein the state information comprises configuration settings, reachability and other provisioning aspects related to the switch.

10. The method of claim 1, wherein executing the script file includes:
downloading the configuration file from a remote configuration server,
comparing configuration settings specified in the downloaded configuration file with a reference configuration associated with the switch, and
applying configuration settings that differ from the reference configuration.

11. The method of claim 10,
wherein,
executing the script file further includes logging into a library in the network storing the configuration file, and
the script file includes login information to the library.

12. The method of claim 1,
wherein,
the network includes two layers of switches, with switches in a first layer connected via link aggregation to switches in a second layer, and
switches in the first layer self-activate prior to switches in the second layer.

13. The method of claim 12, wherein the switches are associated with separate and distinct configuration files.

14. One or more non-transitory tangible media that includes instructions for execution, which when executed by a processor of a switch in a network, is operable to perform operations comprising:
broadcasting, from a network interface of the switch upon powering up, a DHCP discover message;
receiving a DHCP offer message in response to the DHCP discover message, the DHCP offer message comprising names of a script file and a script server hosting the script file, the script file comprising a plurality of instructions in script language that can be executed by a processor of the switch without compiling, wherein the instructions specify a configuration file relevant to the switch;
broadcasting a DHCP request message corresponding to the DHCP offer message;
receiving a DHCP acknowledgement message in response to the DHCP request message, the DHCP acknowledgement message comprising an Internet Protocol (IP) address of the switch;
downloading the script file from the script server; and
automatically executing the script file.

15. The media of claim 14, wherein the script file includes filenames and locations of the configuration file and software images relevant to the switch, method of downloading the configuration file and software images, local storage location and naming conventions on the switch, configuration processes, and software upgrade processes.

16. The media of claim 14, wherein executing the script file includes:
downloading the configuration file from a remote configuration server,
comparing configuration settings specified in the downloaded configuration file with a reference configuration associated with the switch, and
applying configuration settings that differ from the reference configuration.

17. The media of claim 14, wherein the operations further include communicating state information to remote management servers in the network, wherein the state information comprises configuration settings, reachability and other provisioning aspects related to the switch.

18. An apparatus, comprising:
a network interface;
a memory element for storing data; and
a processor operable to execute instructions associated with the data, wherein the processor and the memory element cooperate, such that the apparatus is configured for:
broadcasting, from the network interface upon powering up, a DHCP discover message;
receiving a DHCP offer message in response to the DHCP discover message, the DHCP offer message comprising names of a script file and a script server hosting the script file, the script file comprising a plurality of instructions in script language that can be executed by a processor of a switch without compiling, wherein the instructions specify a configuration file relevant to the switch;
broadcasting a DHCP request message corresponding to the DHCP offer message;
receiving a DHCP acknowledgement message in response to the DHCP request message, the DHCP acknowledgement message comprising an Internet Protocol (IP) address of the switch;
downloading the script file from the script server; and
automatically executing the script file.

19. The apparatus of claim 18, wherein the script file include filenames and locations of the configuration file and software images relevant to the switch, method of downloading the configuration file and software images, local storage location and naming conventions on the switch, configuration processes, and software upgrade processes.

20. The apparatus of claim 18, wherein executing the script file includes:
downloading the configuration file from a remote configuration server,
comparing configuration settings specified in the downloaded configuration file with a reference configuration associated with the switch, and
applying configuration settings that differ from the reference configuration.

\* \* \* \* \*